(12) United States Patent
Kojima et al.

(10) Patent No.: US 6,236,806 B1
(45) Date of Patent: May 22, 2001

(54) FIELD DETECTION APPARATUS AND METHOD, IMAGE CODING APPARATUS AND METHOD, RECORDING MEDIUM, RECORDING METHOD AND TRANSMISSION METHOD

(75) Inventors: Takashi Kojima; Motoki Kato, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/964,192

(22) Filed: Nov. 4, 1997

(30) Foreign Application Priority Data

Nov. 6, 1996 (JP) .................................................. 8-293543

(51) Int. Cl.[7] ...................................................... H04N 5/91
(52) U.S. Cl. ........................ 386/131; 348/441; 348/459; 348/415.15; 348/700; 375/240.15
(58) Field of Search ...................................... 386/129, 131, 386/46; 348/449, 441, 459, 700, 97, 415.1; 375/240.15; H04N 5/91

(56) References Cited

U.S. PATENT DOCUMENTS

| | | | |
|---|---|---|---|
| 5,691,771 | * 11/1997 | Oishi et al. | 348/97 |
| 5,694,170 | * 12/1997 | Tiwari et al. | 348/700 |
| 5,734,419 | * 3/1998 | Botsford, III et al. | 348/97 |
| 5,757,435 | * 5/1998 | Wells | 348/441 |
| 5,798,788 | * 8/1998 | Meechan et al. | 348/180 |
| 5,844,618 | * 12/1998 | Horiiki et al. | 348/441 |
| 5,929,902 | * 7/1999 | Kwok | 386/131 |
| 6,058,140 | * 5/2000 | Smolenski | 348/700 |

\* cited by examiner

*Primary Examiner*—Wendy R. Garber
*Assistant Examiner*—Vincent F. Boccio
(74) *Attorney, Agent, or Firm*—Frommer Lawrence & Haug, LLP.; William S. Frommer; Joe H. Shallenburger

(57) ABSTRACT

A field detection apparatus and method for determining, from an image signal of consecutive frames, each frame including two fields, whether a given field is a repeat of the prior field that precedes two fields ahead of the given field. Based on a predetermined detection criterion, a repeat field which is identical to the prior field that precedes two fields ahead of the repeat field is detected, and the predetermined detection criterion is changed between when the detection period for the repeat field applied to the image signal is stable and when the detection period for the repeat field applied to the image signal is unstable. With this arrangement, the repeat field is accurately detected. Also disclosed are an image coding apparatus and method for coding an image signal of consecutive frames, each frame including two fields. The repeat field which is identical to the prior field that precedes two fields ahead of the repeat field is detected, the repeat field or the prior field that precedes two fields ahead of the repeat field is selected, both the selected field and the prior field that precedes one field ahead of the repeat field are coded as one frame, and a coded signal is thus generated. With this arrangement, the efficiency of coding is heightened.

27 Claims, 29 Drawing Sheets

PATTERN 1
Top_Field_First =1
Repeat_First_Field =0

PATTERN 2
Top_Field_First =1
Repeat_First_Field =1

PATTERN 3
Top_Field_First =0
Repeat_First_Field =0

PATTERN 4
Top_Field_First =0
Repeat_First_Field =1

FIG. 15

| Cmp(i) | | | | | | PULL-DOWN PATTERN | |
|---|---|---|---|---|---|---|---|
| Cmp(0) | Cmp(1) | Cmp(2) | Cmp(3) | Cmp(4) | Cmp(5) | FIELD OF INTEREST IS TOP FIELD | FIELD OF INTEREST IS BOTTOM FIELD |
| 0 | 1 | 1 | 1 | 1 | 0 | 2 | 4 |
| 1 | 1 | 0 | 1 | 1 | 1 | 1 | 3 |

FIG. 19

| TOP FIELD | A | | B | | C | | D | | E | | F | |
|---|---|---|---|---|---|---|---|---|---|---|---|---|
| BOTTOM FIELD | | a | | b | | c | | d | | e | | f |
| Cmp(i) | 0 | 1 | 1 | 0 | 1 | 0 | 1 | 0 | 1 | 0 | 1 | 1 | 0 | 1 | 1 |
| PULL-DOWN PATTERN | 2 | | 4 | | 2 | | 4 | | 2 | | 4 | |

FIG. 20

| Cmp | | | | PULL-DOWN PATTERN | |
|---|---|---|---|---|---|
| Cmp(0) | Cmp(1) | Cmp(2) | Cmp(3) | FIELD OF INTEREST IS TOP FIELD | FIELD OF INTEREST IS BOTTOM FIELD |
| 0 | 1 | 1 | 0 | 2 | 4 |

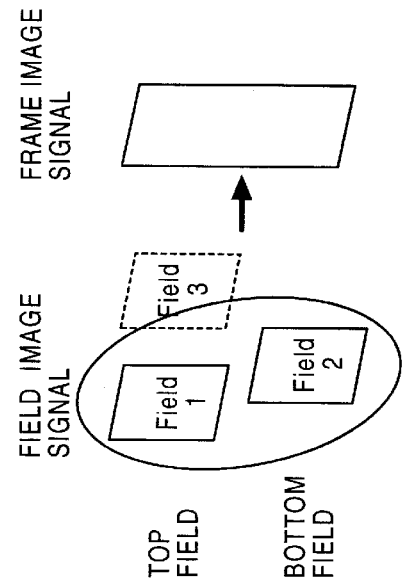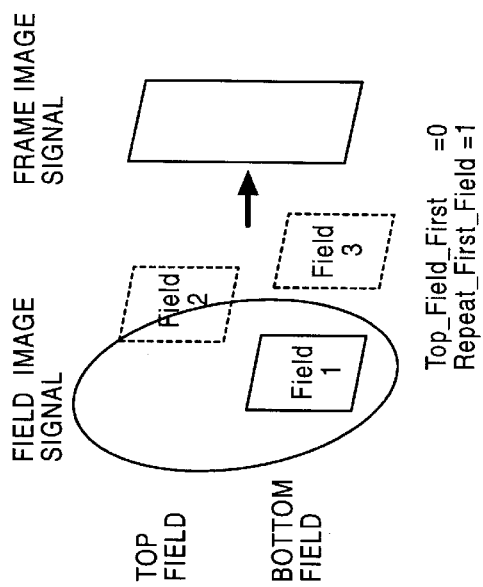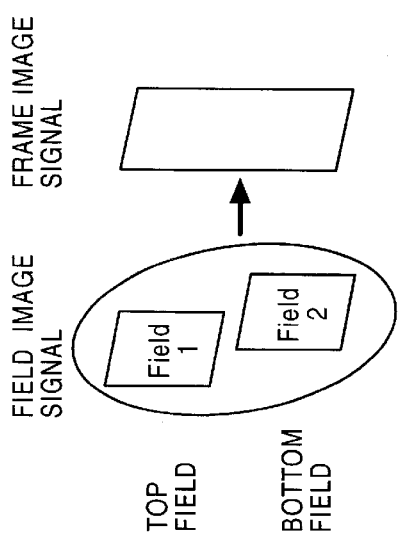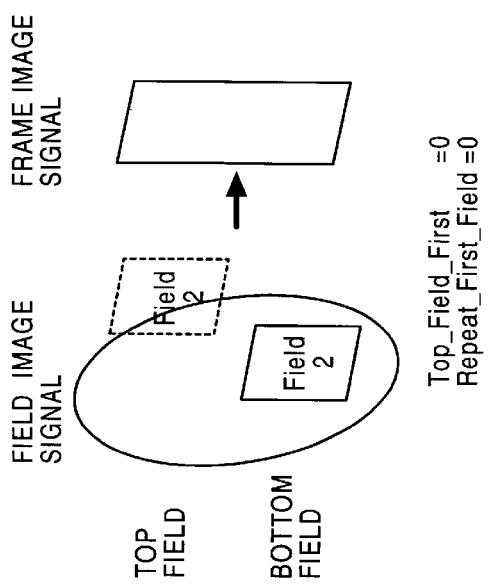

FILM

TOP FIELD

BOTTOM FIELD

VIDEO SIGNAL

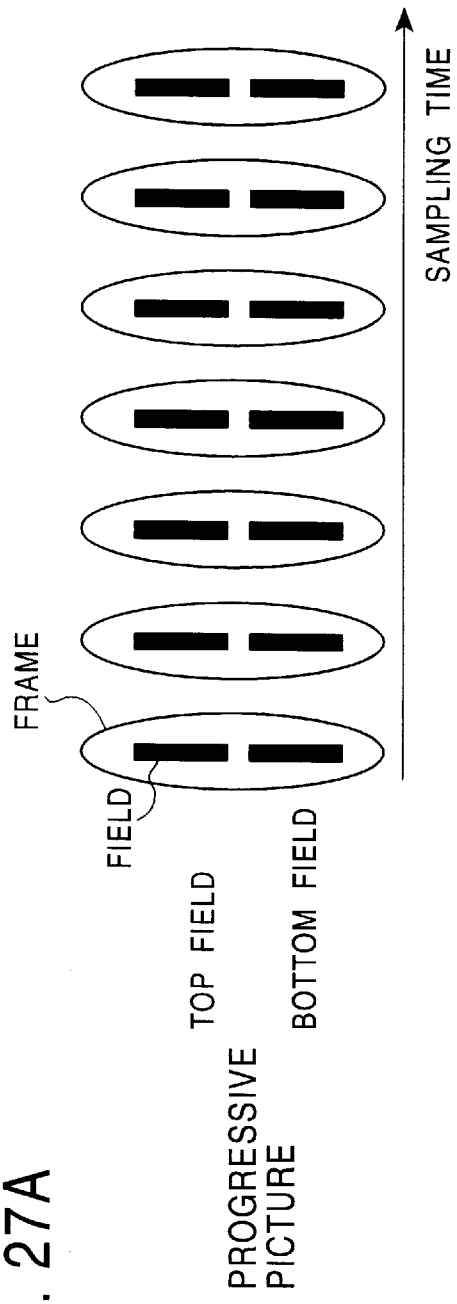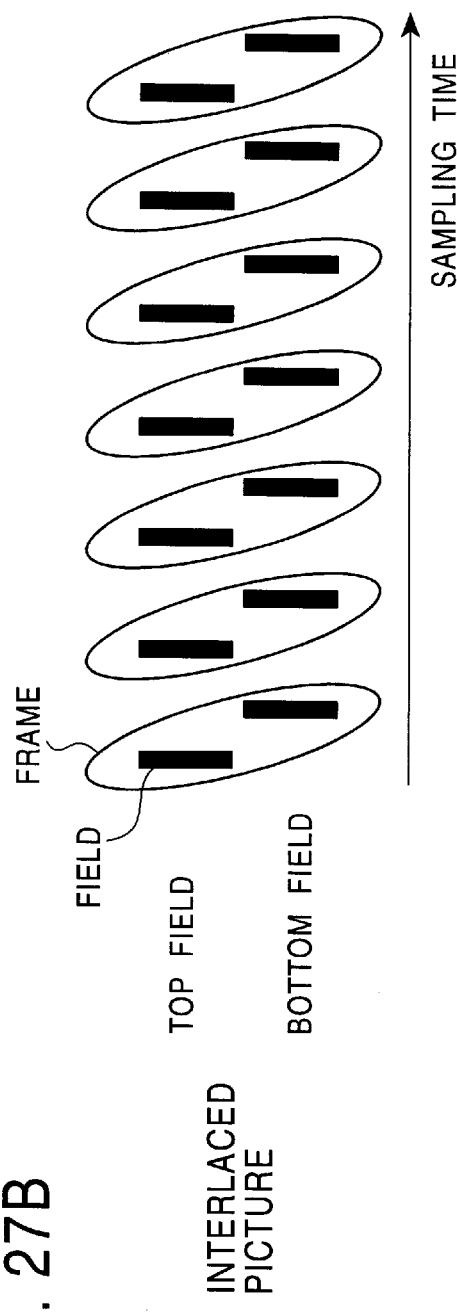

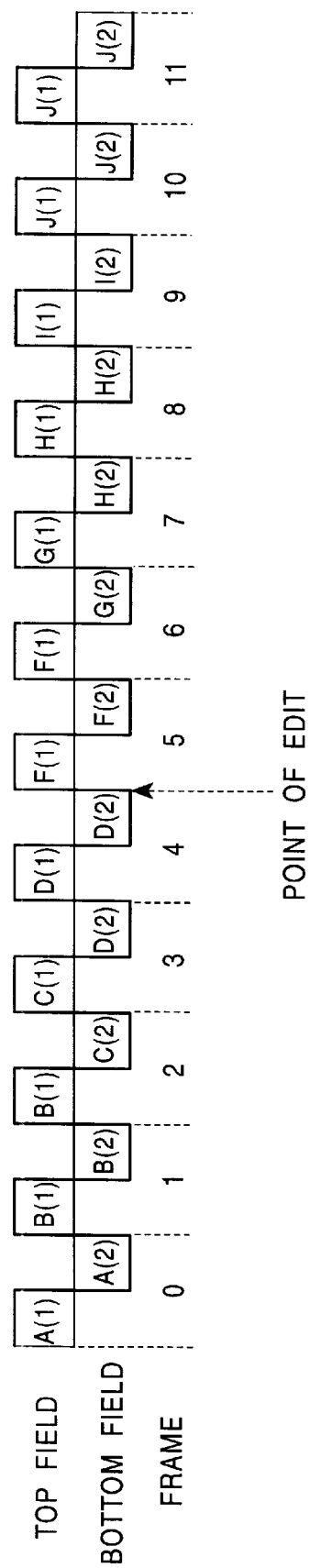

FIELD DETECTION APPARATUS AND METHOD, IMAGE CODING APPARATUS AND METHOD, RECORDING MEDIUM, RECORDING METHOD AND TRANSMISSION METHOD

BACKGROUND OF THE INVENTION

1. Field of the Invention

The present invention relates to a field detection apparatus and method, an image coding apparatus and method, a recording medium, a recording method and a transmission method. More particularly, the present invention relates to a field detection apparatus and field detection method, an image coding apparatus and image coding method, a recording medium and recording method and a transmission method, wherein an image signal obtained by pulldown processing a motion-picture film or the like is coded with the same fields deleted, and is recorded onto a storage or recording medium such as an optical disk, a magnetic disk, and a magnetic tape, and is transmitted via a transmission line.

2. Description of the Related Art

A motion picture projected in a movie theater is made up of consecutive photographs on a film. To broadcast it as a television program or to sale it in the form of a video package, the motion-picture signal needs to be converted into an image signal (video signal) that is an electric signal for television broadcasting. More particularly, the images on the film that are optically projected are electrically picked up, with the conversion of the display rate of image and other processings involved. Such a technique is generally called telecine.

The image signal and film are different in the number of images displayed per second. In many of motion-picture films, 24 pictures (frames) per second are projected while 29.97 frames are presented in the image signal in accordance with the NTSC standard. The conversion of frame rate is one of the major processings in the telecine. A technique called 2-3 pulldown is widely used to convert the frame rate.

A moving picture is made up of a set of consecutive images, each called a frame. The frame may be divided into fields as shown in FIG. 26. The frame constructed of odd-numbered line pixels is called a top field while the frame constructed of even-numbered line pixels is called a bottom field.

The frames are classified into two types: progressive pictures and interlaced pictures. The progressive picture and interlaced picture are different in the timing of sampling the image. More particularly, the top field and the bottom field are at the same sampling timing (FIG. 27A) in the progressive picture while there is a difference in the sampling timing between the even-numbered lines and the odd-numbered lines within one frame in the interlaced picture. As a result, the top field and the bottom field are different in the sampling timing (FIG. 27B).

The motion-picture film signal presents a progressive picture while the image signal presents an interlaced picture.

In the 2-3 pulldown process, the film of 4 frames is converted to the image signal of 5 frames. In the 2-3 pulldown process, one film frame is divided into the top field and the bottom field as shown in FIG. 26. The top field and bottom field are appropriately assigned to the fields of image signal.

More particularly, the four film frames are designated A, B, C and D in time series, and the top field and bottom field divided from the frame A are designated A(1) and A(2), respectively. Frames B, C and D are designated in a similar fashion. As shown in FIG. 28, a first frame is constructed of the top field A(1) and bottom field A(2), and a second frame is constructed of the top field B(1) and bottom field B(2). A third frame is constructed of the top field B(1) and bottom field C(2), and a fourth frame is constructed of the top field C(1) and bottom field D(2). A fifth frame is constructed of the top field D(1) and bottom field D(2).

As described above in the 2-3 pulldown processing, the field B(1) is assigned as the top field in a second frame and the subsequent top field (the top field in the third frame) that follows two fields behind the second top field. The field D(2) is assigned as the bottom field in the fourth frame and the subsequent bottom field (the bottom field in the fifth frame) that follows two fields behind the fourth bottom field. In this way, the film frames in the unit of four frames are converted to an image signal in the unit of five frames.

In the 2-3 pulldown processed image signal (the image signal obtained by 2-3 pulldown processing the film), a subsequent field that is identical to a field that precedes two fields ahead of the subsequent field appears every five fields.

In the 2-3 pulldown processed image signal as described above, a subsequent field, which follows two fields behind a field of interest and which is identical to the field of interest, is called a repeat field.

It has been recently proposed that the repeat field be removed to form a progressive picture before coding when the 2-3 pulldown processed image signal is coded in accordance with MPEG (Moving Picture Experts Group) standard. Since the repeat field is identical to the field that precedes two fields ahead of the repeat field, the removal of the repeat field reduces redundancy and improves coding efficiency.

To delete the repeat field, the detection of the repeat field from the 2-3 pulldown processed image signal is first required.

The inventor of this invention has disclosed a technique for the detection of the repeat field from the 2-3 pulldown processed image signal, for example, in U.S. patent application Ser. No. 08/578,317 (filed Dec. 27, 1997), U.S. Pat. No. 5,691,771.

The detection method of the repeat field proposed in the above disclosure is now briefly discussed.

In the detection of the repeat field, a differential value between a field of interest and a subsequent field that follows two fields behind the field of interest (the subsequent field comes in two fields later in time, namely a future field) is computed, and the differential value is compared with a predetermined threshold.

Now suppose that a field of interest is the top field A(1) in the first frame shown in FIG. 28, the two-field late field is the top field B(1) in the second frame. The differential value therebetween is above the predetermined threshold. When a field of interest is the top field B(1) in the second frame, the two-field late field is the top field B(1) in the third frame, and the differential value therebetween is ideally 0, namely below the predetermined threshold value.

If the result of comparison of the differential value with the predetermined threshold value determines that the differential value is equal to or smaller than the predetermined threshold value, the subsequent field that follows two fields behind the field of interest is detected as a repeat field.

As described above, in the 2-3 pulldown processed image signal, the repeat field appears every five fields in principle.

Once the repeat field is detected, the subsequent field that follows five fields behind the repeat field is handled as a new field of interest. The differential value to the new field of interest is compared with the predetermined threshold value. When the differential value is equal to or smaller than the threshold value, the two-field later field is considered as a repeat field.

If the 2-3 pulldown processed image signal is subjected to editing process, for example, the repeat field may fail to appear every five fields. In such a case, even if the subsequent field that follows five fields behind the field of interest is handled as a new field of interest, the differential value of the new field is neither equal to nor smaller than the predetermined threshold value. The repeat field is difficult to detect if the five-field late field is handled as a new field of interest in this case.

When the five-field late field, handled as a new field of interest, has a differential value neither equal to nor smaller than the predetermined threshold, the immediately subsequent field (which follows one field behind the field of interest) is handled as a new field of interest, and the differential value of the new field of interest is compared with the predetermined threshold value. This process of handing the immediately subsequent field as a new field of interest, step by step, is repeated until a field having a differential value equal to or smaller than the predetermined threshold value appears. Hereinafter, this process is referred to as a step-by-step process.

When a field of interest having a differential value equal to or smaller than the predetermined threshold value and when the field of interest is odd number fields late from the last detected repeat field, the subsequent field that follows two fields behind the field of interest is detected as a repeat field. The subsequent field that follows five fields behind is handled as a new field of interest. Hereinafter, this process is referred to as a periodic process.

When a field of interest having a differential value equal to or smaller than the predetermined threshold value and when the field of interest is even number fields late from the last detected repeat field, the step-by-step process is repeated.

FIG. 29 illustrates a (2-3 pulldown processed) image signal in which an editing performed between a fifth frame and a sixth frame causes the appearance pattern of the repeat field to change from the duration of zero-th frame to fifth frame to the duration of sixth frame thereafter.

According to the detection method of the repeat field, the top field B(1) in the second frame is detected as a repeat field in the step-by-step process. The periodic process is then entered, in which the bottom field D(2) in the fourth frame is detected as a repeat field. The top field G(1) in the seventh frame that follows five fields behind the bottom field D(2) is not a repeat field and is not detected. The step-by-step process is thus initiated, and the top field G(1) in the eighth frame is detected as a repeat field. Control is shifted into the periodic process, in which the bottom field I(2) in the tenth frame that is five fields away is detected as a repeat field. Likewise, a repeat field is repeatedly detected every five fields thereafter.

There are times when the sixth frame and its subsequent frames have consecutively more still picture portion than the images of zero-th frame to the fifth frame in FIG. 29. The differential value of each of the sixth frame and its subsequent frames is almost 0, namely smaller than a predetermined value. As a result, the top field G(1) in the seventh frame that is five fields away from the bottom field D(2) in the fourth frame (repeat field) may erroneously be detected as a repeat field, even though it is actually not.

In the coding process, the top field G(1) in the seventh frame may be considered as a repeat field of the top field F(1) in the sixth frame that is two fields earlier, and is thus deleted.

When nearly still pictures appear consecutively, an erroneous detection is repeated every five fields, and fields which are not actually a repeat field are deleted. If such images are decoded, the motion of the images looks unnatural.

The 2-3 pulldown processed image signal is sometimes subjected to filtering process such as "time filter" to remove noise or to give a natural looking feature. Such a filtering increases the differential value between the repeat field and the prior field that precedes two fields ahead of the repeat field (the prior field comes in two fields earlier in time, namely a past field). As a result, fields that are actually a repeat field may escape detection. In this case, the repeat field is coded without being deleted, thereby degrading coding efficiency.

The periodic process detects a repeat field every five fields in the above repeat field detection method as described above. If no repeat field is detected five fields later, the detection of a repeat field through the step-by-step process is expected, at best, seven fields later than the last detected repeat field. At worst, the detection of a repeat field must wait for the field that is thirteen fields away.

FIG. 30 illustrates a (2-3 pulldown processed) image signal in which an editing performed between a fourth frame and a fifth frame causes the appearance pattern of the repeat field to change from the duration of zero-th frame to fourth frame to the duration of fifth frame and its subsequent frames thereafter.

The bottom field D(2) in the fourth frame appears as a repeat field and the top field F(1) in the sixth frame then comes in as a repeat field. According to the above-described repeat field detection method, however, the top field G(1) in the seventh frame that comes in five fields later is handled as a repeat field candidate after the bottom field D(2) in the fourth frame is detected as the repeat field. The top field F(1) in the sixth frame thus escapes repeat field detection.

Since the top field G(1) in the seventh frame that comes in five fields later than the bottom field D(2) in the fourth frame is not a repeat field, the step-by-step process is thereafter entered. The top field J(1) in the eleventh frame is the first repeat field detected since the step-by-step process was activated.

The repeat field that appears first after the activation of the step-by-step process is actually the bottom field H(2) in the eighth frame. Since the bottom field H(2) is even number, eight fields away from the last detected bottom field D(2) in the fourth frame, it is not detected as a repeat field. As a result, the first detected repeat field in the step-by-step process is the top field J(1) in the eleventh frame that is odd number, 13 fields away from the bottom field D(2) in the fourth frame.

Although the top field F(1) in the sixth frame and the bottom field H(2) in the eighth frame are redundant data, they are coded, thereby reducing coding efficiency.

One technique is available in which the step-by-step process only is performed with no periodic process combined therewith. As already described, such a technique erroneously detects a field as a repeat field and deletes it if nearly still images consecutively appear.

There are times when the construction of progressive pictures after the repeat fields are detected and then removed is not necessarily appropriate.

More particularly, when the top field B(1) in the second frame, one of the repeat fields, is deleted in FIG. 30, the two prior fields, namely the immediately prior field and the field that preceds two fields ahead of the repeat field (the bottom field B(2) in the first frame and the top field B(1) in the first frame) constitute a progressive picture and are then coded.

Although the repeat field and the field that precedes two fields ahead of the repeat field are essentially the same image, a slight discrepancy arising from filtering process by a time filter may take place therebetween.

Rather than deleting the repeat field to construct the progressive picture of the immediately prior field and the field that precedes two fields ahead of the repeat field, the field that precedes two fields ahead of the repeat field is deleted, and the progressive picture is constructed of the repeat field and the field immediately prior to the repeat field. This arrangement sometimes presents an improved coding efficiency.

SUMMARY OF THE INVENTION

Accordingly, it is an object of the present invention to detect accurately a repeat field from a 2-3 pulldown processed image signal and to code it efficiently.

A field detection apparatus and method of the present invention which determine, from an image signal of consecutive frames, each frame including two fields, whether a given field is a repeat of the prior field which precedes two field ahead of the given field, receive the image signal, and detect the repeat field which is identical to the prior field which precedes two fields ahead of the repeat field based on a predetermined detection criterion, wherein the detection criterion for detecting the repeat field is changed by field detection means between when the detection period for the repeat field applied to the image signal is stable and when the detection period for the repeat field applied to the image signal is unstable.

The field detection means computes a differential value between at least one input field and the subsequent field which follows two fields behind the input field, and detects the repeat field based on the differential value that is the output of computing means.

An image coding method and apparatus of the present invention for coding an image signal of consecutive frames, each frame including two fields, detect a repeat field which is identical to the prior field that precedes two field ahead of the repeat field, select between the repeat field and the prior field that precedes two fields ahead of the repeat field and code both the selected field and the prior field that precedes one field ahead of the repeat field as one frame to generate a coded signal.

A recording medium of the present invention holds recorded signal including coded signal and repeat information and is subjected to decoding by an image decoding apparatus corresponding to an image coding apparatus, wherein the coded signal is constructed by detecting a repeat field which is identical to the prior field that precedes two fields ahead of the repeat field, by selecting between the repeat field and the prior field that precedes two fields ahead of the repeat field and by coding both the selected field and the prior field that precedes one field ahead of the repeat field as one frame to generate a coded signal.

A recording method and transmission method of the present invention for recording and transmitting, respectively, a coded signal obtained by coding an image signal of consecutive frames, each frame including two fields detect a repeat field which is identical to the prior field that precedes two fields ahead of the repeat field, select between the repeat field and the prior field that precedes two fields ahead of the repeat, code both the selected field and the prior field that precedes one field ahead of the repeat field as one frame to generate a coded signal, and record and transmit the coded signal, respectively.

BRIEF DESCRIPTION OF THE DRAWINGS

FIG. 15 illustrates the relationship between comparative information Cmp(0)–Cmp(5) and the pulldown pattern;

FIG. 19 illustrates the relationship of the sequence of the image signal of FIG. 18, the comparative information Cmp (i), and the pulldown pattern;

FIG. 20 illustrates the relationship between the comparative information Cmp(0)–Cmp(3) and the pulldown pattern;

FIGS. 23A–23D illustrate the process by a selector 24 of FIG. 22;

FIGS. 27A and 27B illustrate a progressive picture and an interlaced picture;

FIG. 30 illustrates a 2-3 pulldown processed image that has been edited.

DESCRIPTION OF THE PREFERRED EMBODIMENTS

The embodiments of the present invention are now discussed. Many variations and modifications will be apparent to those skilled in the art, and it is to be understood that the present invention is not limited to the embodiments that follow.

Figure 1:
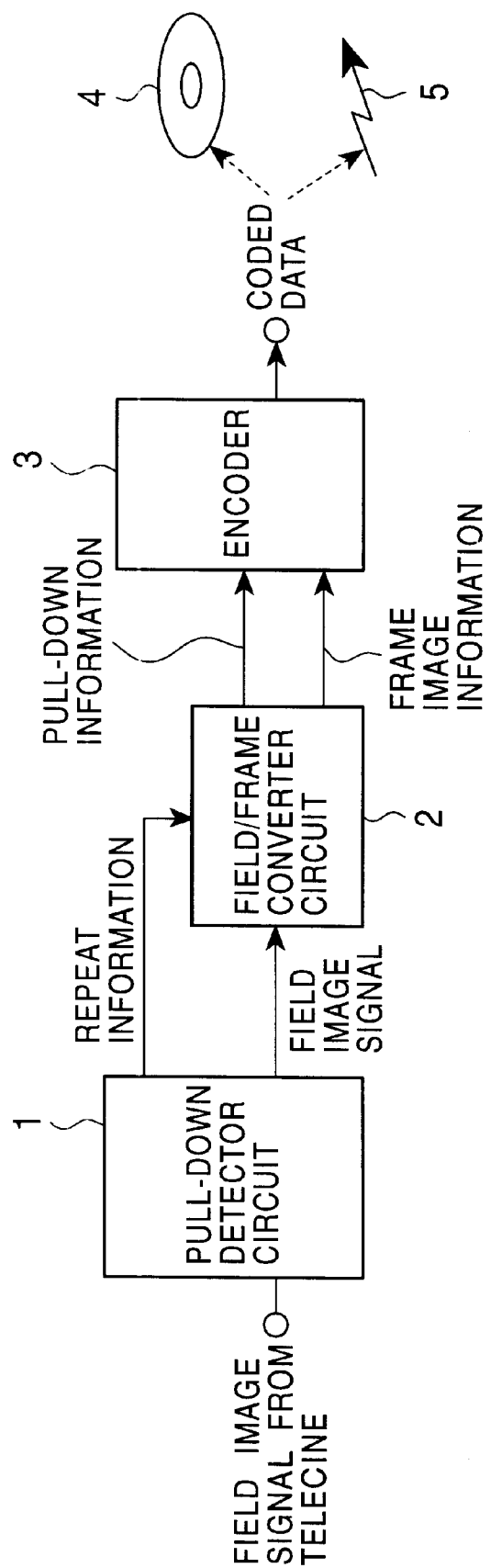
FIG. 1 is a block diagram showing one embodiment of the image coding apparatus of the present invention.

FIG. 1 is a block diagram showing one embodiment of the image coding apparatus of the present invention. The image coding apparatus receives a 2-3 pulldown processed image signal and removes repeat fields from the image signal to efficiently code it.

A pulldown detector circuit 1 is designed to receive an 2-3 pulldown processed image signal that is obtained from a motion-picture film through a telecine process. The image signal (also referred to as field image signal) is made up of consecutive frames, each frame being constructed of two fields. The field image signal meets the widely used standard specifications including the NTSC format and PAL format.

The pulldown detector circuit 1 detects a repeat field from the field image signal input thereto, and feeds, to a field/frame converter circuit 2, repeat information about repeat field detection result along with the field image signal.

The field/frame converter circuit 2 recognizes the repeat field in the field image signal coming from the pulldown detector circuit 1 based on the repeat information from the pulldown detector circuit 1. The field/frame converter circuit 2 selects between the recognized repeat field and the field that precedes two fields ahead of the repeat field, and constructs a progressive picture (also referred to as frame image signal) of the selected field and the frame that precedes one field ahead of the repeat field. The field/frame converter circuit 2 outputs, to an encoder 3, the frame image signal along with pulldown information to be described later.

The encoder 3 MPEG codes the frame image signal from the field/frame converter circuit 2 and multiplexes the coded signal, the pulldown information from the field/frame converter circuit 2 and other necessary information. The resulting coded data is then recorded onto a recording medium 4 such as an optical disk, a magneto-optic disk, a magnetic disk, a magnetic tape, an optical card, a phase change disk or the like. The coded data may also be transmitted via a transmission path 5 such as satellites, terrestrial networks, CATV (Cable Television) networks, the Internet or the like.

Figure 2:
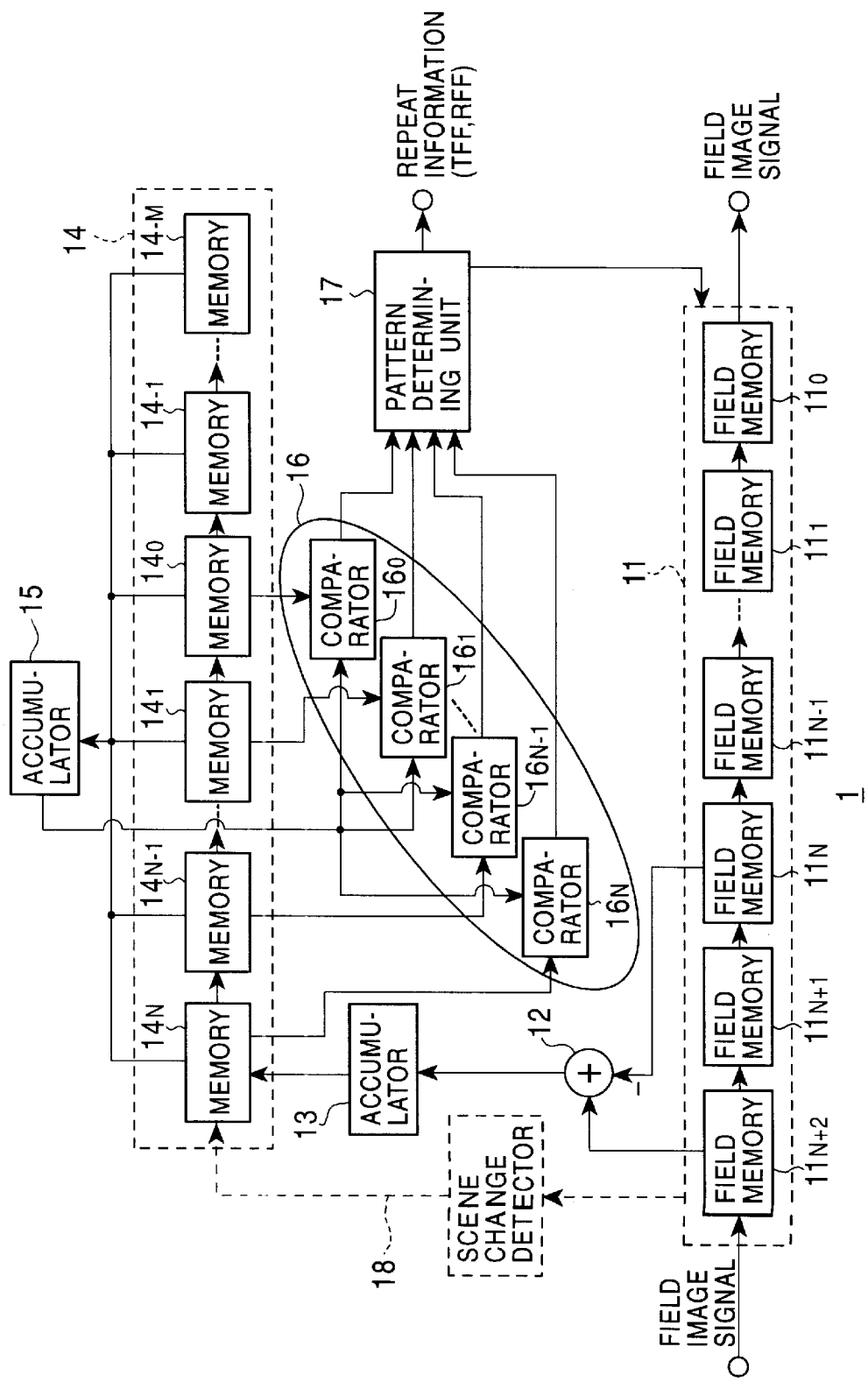
FIG. 2 is a block diagram showing the construction of a pulldown detection circuit 1 of FIG. 1.

FIG. 2 is a block diagram showing the construction of a pulldown detector circuit 1 of FIG. 1.

The field image signal is fed to a field memory group 11. The field memory group 11 includes N+3 field memories, $11_0-11_{N+2}$ (N is an integer equal to or greater than 0). The field image signal is first stored in the field memory $11_{N+2}$. When another field image signal is fed, the field image signal stored in the field memory $11_{N+2}$ is transferred to the field memory $11_{N+1}$ while the field memory $11_{N+2}$ stores the newly fed field image signal.

Likewise, each time a new field image signal is fed, the field image signals stored in the field memories $11_{N+2}$ through $11_1$ are sequentially shifted to respective succeeding stages of field memories $11_{N+1}$ through $11_0$, while the field memory $11_{N+2}$ stores the new field image signal. The field image signal stored in the field memory $11_0$ is transferred to the field/frame converter circuit 2 when a new field image signal is fed to the field memory group 11.

An arithmetic unit 12 reads the field image signal stored in the field memory $11_N$ and the field image signal stored in the field memory $11_{N+2}$, computes a pixel differential value between both field image signals, and outputs it to an accumulator 13. The arithmetic unit 12 computes the differential value between a field image signal stored in the field memory $11_N$ for a field of interest and the field image signal of the field that precedes two fields ahead of the field of interest.

Now considered is the xy coordinate system with the x coordinate horizontally aligned and the y coordinate vertically aligned and with its origin (0,0) at the top left pixel of the field image signal. Let $Y(N)(x,y)$ represent the pixel value at the field of interest and $Y(N_{+2})(x,y)$ represent the pixel value at the field that precedes two fields ahead of the field of interest. The arithmetic unit 12 computes the following equation, resulting in the differential value of the field of interest $SAB(x,y)$ (an absolute differential value, for example).

$$SAB(x,y)=|Y(N+2)(x,y)-Y(N)(x,y)|$$

The accumulator 13 computes the total sum of the output of the arithmetic unit 12 on a field-by-field basis, and outputs the computation result to the memory group 14.

The memory group 14 is constructed of M+N+1 memories, $14_{-M}, 14_{-M+1}, \ldots, 14_{-1}, 14_0, 14_1, \ldots, 14_{N-1}, 14_N$ (M is an integer equal to or greater than 0). The output of the accumulator 13 is first stored in the memory $14_N$.

Upon receiving the computation result from the accumulator 13, the value stored in memory $14_N$. transferred to the memory $14_{N-1}$ while the memory $14_N$ stores a new output from the accumulator 13. Likewise, each time a new computation result is fed by the accumulator 13, the values in the memories $14_N$ through $14_{-M+1}$ are transferred to their respective succeeding stages of $14_{N-1}$ through $14_{-M}$ while a new computation result is stored in the memory $14_N$. The computation result stored in the memory $14_{-M}$ is discarded when a new computation result is fed to the memory group 14.

When the new computation result is fed to the memory $14_N$, an accumulator 15 reads the values stored in the memories $14_{-M}$ through $14_N$ and computes their average. The average as a predetermined threshold value is fed to comparators $16_0$ through $16_N$ constituting a comparator group 16.

The values stored in memories $14_0$ through $14_N$ are respectively fed to the comparators $16_0$ through $16_N$. The comparators $16_0$ through $16_N$ compare respective values from the memories $14_0$ through $14_N$ with the threshold value from the accumulator 15, and outputs comparative information Cmp(O) through Cmp(N) as comparison results to a pattern determining unit 17.

The pattern determining unit 17 detects a repeat field based on the comparative information Cmp(0) through Cmp(N) from the respective comparators $16_0$ through $16_N$, and outputs repeat information as the detection result to the field/frame converter circuit 2.

Figure 3:
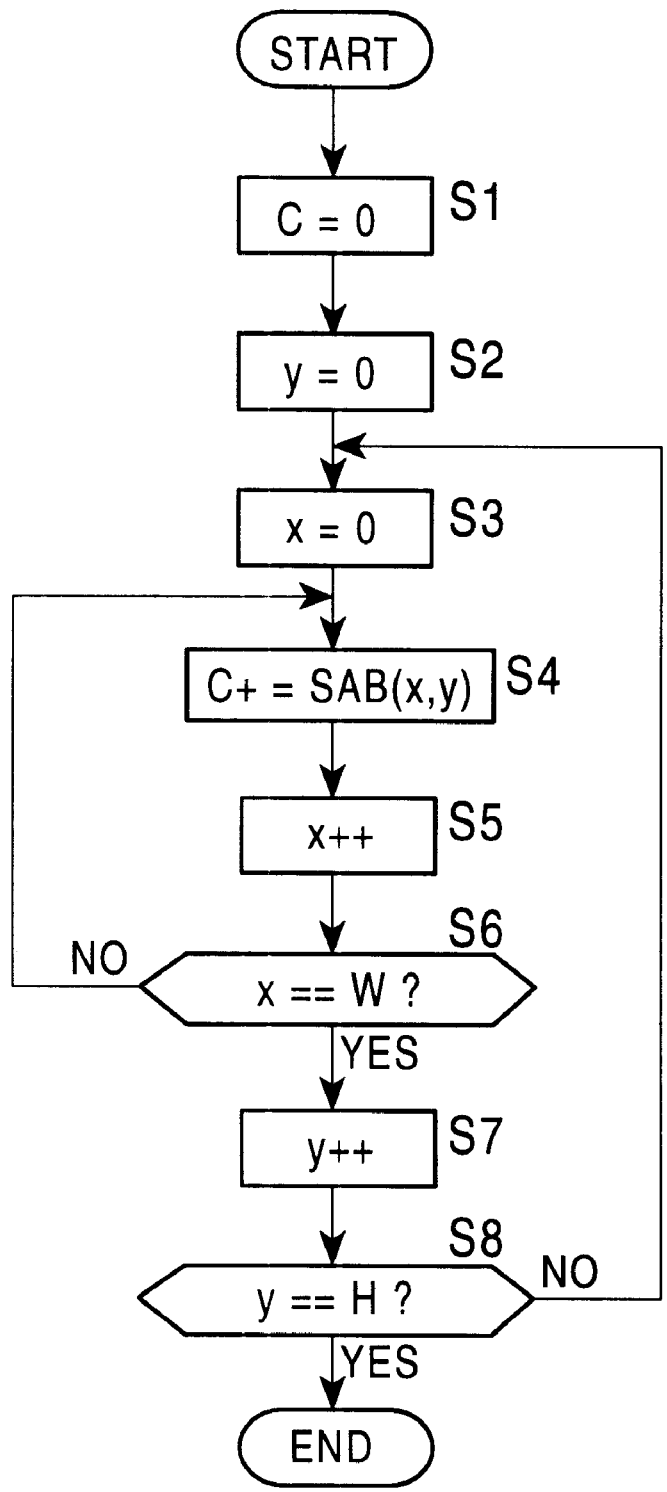
FIG. 3 is a flow diagram showing the process by an accumulator 13 of FIG. 2.

Referring now to a flow diagram shown in FIG. 3, the process by the accumulator 13 is further discussed.

In step S1, a variable C is set to 0 as its initial value in the accumulator 13. In step S2, a variable y indicative of the y coordinate of the pixel of the field image is set to 0, for example, and the process goes to step S3.

In step S3, a variable x indicative of the x coordinate of the pixel of the field image is set to 0, for example, and the process goes to step S4. In step S4, the differential value SAB(x,y) fed by the arithmetic unit 12 is added to C, and the addition result is newly set as the variable C.

In step S5, the variable x is incremented by 1, and the process goes to step S6, where it is determined whether the variable x is equal to the number of pixels on the horizontal row of the field image signal. When it is determined in step S6 that the variable x is not equal to the number W, the process returns to step S4. When it is determined in step S6 that the variable x is equal to the number W, the process goes to step S7, where the variable y is incremented by 1.

It is determined in step S8 whether the variable y is equal to the number of pixels H of the vertical column of the field image signal (the number of lines). When it is determined in step S8 that the variable y is not equal to the number H, the process returns to step S3. When it is determined in step S8 that the number of variable y is equal to the number H, the process ends.

The accumulator 13 performs the above process each time a new field image signal is stored in the field memory $11_{N+2}$, and the sum C of the absolute differential values for the pixels between the field of interest and the field that precedes two fields ahead of the field of interest is thus computed. The computed value C given by the accumulator 13 indicates the identity of the field of interest with the field that precedes two fields ahead of the field of interest (the computed value C is also referred to as identity information). As the field of interest is more closely similar to the field that precedes two fields ahead of the field of interest, the identity information C becomes smaller (when one is identified with the other, the identity information is ideally 0).

Figure 4:
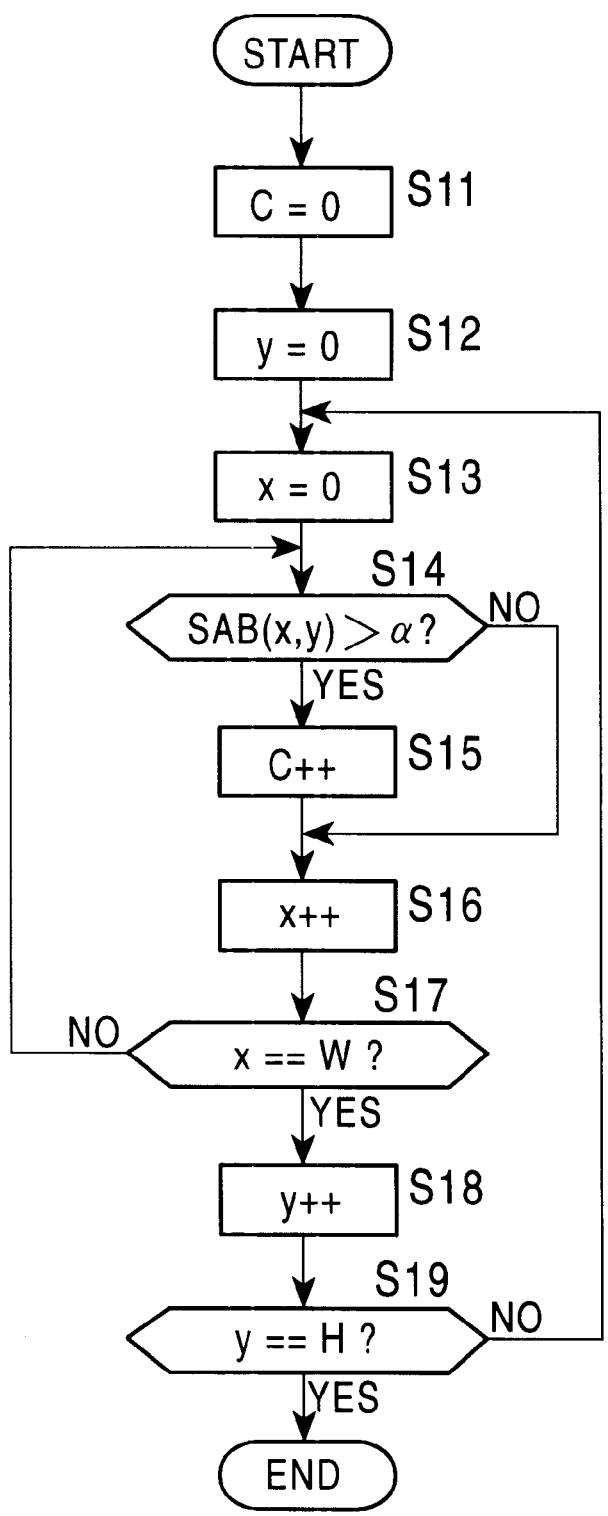
FIG. 4 is a flow diagram showing the process by the accumulator 13 of FIG. 2.

The identity information C may be determined by the accumulator 13 on a per field basis as shown in a flow diagram shown in FIG. 4.

Steps S11 through S13 work in the same manner as in steps S1 through S3 in FIG. 3, respectively. It is then determined in step S14 whether the differential value SAB (xry) fed by the arithmetic unit 12 is greater than (alternatively equal to or greater than) a positive value α. When it is determined in step S14 that the differential value SAB(x,y) is greater than α, the process goes to step S15, where the variable C is incremented by 1. The process goes to step S16. When it is determined in step S14 that the differential value SAB(x,y) is equal to or smaller than α, the process goes to step S16 skipping step S15.

Steps S16 through S19 work in the same manner as steps S5 through S8 in FIG. 3, respectively.

The number of pixels in one field that present the differential value SAB(x,y) greater than a becomes the identity information C.

Figure 5:
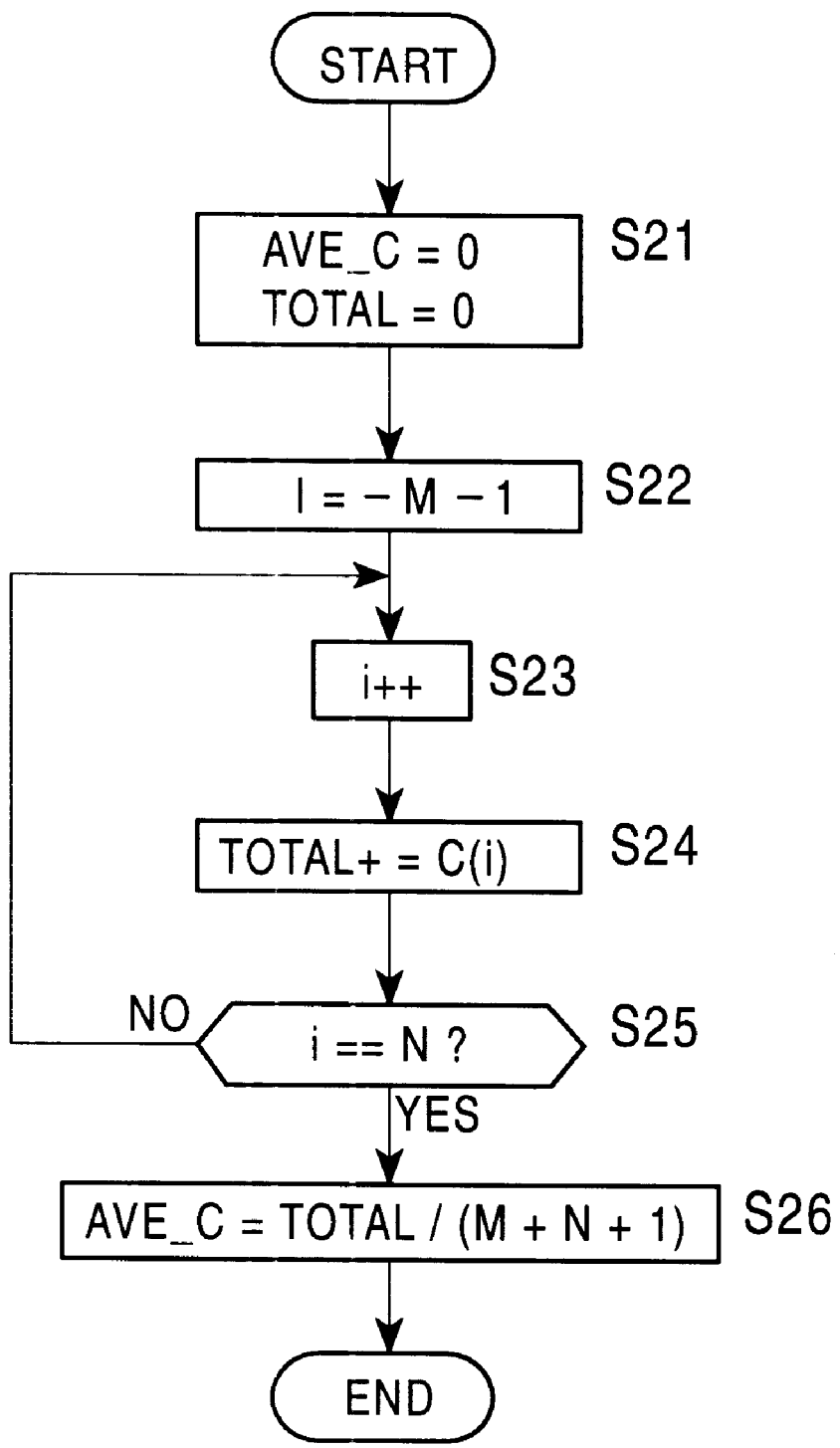
FIG. 5 is a flow diagram showing the process by the accumulator 15 of FIG. 2.

Referring to a flow diagram shown in FIG. 5, the process by the accumulator 15 in FIG. 2 is further discussed.

In step S21, a variable AVE_C storing the average value of the identity information C stored in the memories $14_{-M}$ through $14_N$ and TOTAL storing the sum of values stored in the memories $14_{-M}$ through $14_N$ are set to 0 as their initial values, for example, in the accumulator 15 and the process goes to step S22. In step S22, a variable i is set to −M−1 as its initial value.

The variable i is incremented by 1 in step S23. In step S24, the identity information C(i) is added to the variable TOTAL, and the addition result is freshly stored in the variable TOTAL. The identity information C(i) herein represents the identity information C stored in the memory $14_i$.

It is now determined in step S25 whether the variable i is equal to N. When it is determined in step S25 that the variable i is not equal to N, the process returns to step S23. When it is determined in step S25 that the variable i is equal to N, more particularly, when the sum of the values stored in memories $14_{-M}$ through $14_N$ is stored in the variable TOTAL, the process goes step S26. The variable TOTAL is divided by M+N+1, namely the number of memories $14_{-M}$ through $14_N$. The division result, namely the average value of the identity information C(−M) through C(N) respectively stored in memories $14_{-M}$ through $14_N$, is set as the variable $AVE_{13}C$ to end the process.

The accumulator 15 performs the above process each time the new identity information C(N) is stored in the memory $14_N$. Now let the field corresponding to the identity information C(0) stored in the memory $14_0$ (the field image signal stored in the field memory $11_0$) be a field of interest. The average value AVE_C is determined by averaging the identity information C(0) of the field of interest, the identity information C(−1) through C(−M) of all (past) fields through to the field that precedes M fields ahead of the field of interest and the identity information C(1) through C(N) of all (future) fields through to the field that follows N fields behind the field of interest.

The average value AVE_C thus determined by the accumulator 15 is fed to the comparators $16_0$ through $16_N$ and is used as the threshold value that is compared with the identity information C(0) through C(N) stored in the memories $14_0$ through $14_N$ to determine whether each of the identity information is greater than or smaller than the threshold value in magnitude.

The identity information C(i) of the field image signal stored in the field memory $11_i$ equal to or smaller than (alternatively smaller than the threshold value) the threshold value means that there is a high probability that the image signal that follows two fields behind the field of interest is a repeat field. Conversely, the identity information C(i) of the field image signal stored in the field memory $11_i$ greater than (alternatively, equal to or greater than) the threshold value means that there is a high probability that the image signal that follows two fields behind the field of interest is not a repeat field.

Generally speaking, the value of the identity information C(i) is small when the field image signal is in a relatively small degree of motion and is great when it is in a relatively large degree of motion.

The identity information C(i) is compared with the fixed threshold value and based on the comparison result, a determination is made of whether the probability that the field image signal following two fields behind is a repeat field is high. In this method, the fixed threshold value is relatively too large with respect to the field image signal in little motion, and a field image signal that is not actually a repeat field may be erroneously determined to be a repeat field. The fixed threshold value is relatively too small with respect to the field image signal in large motion, and a field image signal that is actually a repeat field may be erroneously determined to be a non-repeat field.

Rather than comparing the identity information C(i) with a fixed threshold value, the identity information C(i) is compared with the average value AVE_C of the field image signal corresponding to the identity information C(i) and the identity information of the field image signals prior to and subsequent to the field to prevent above erroneous determination to preclude the erroneous determination (the frequency of erroneous determination is substantially reduced).

The average value AVE_C of the identity information C varies along with the field image signals in the vicinity of the field of interest. When field image signals in little motion consecutively come in, the magnitude of the average value becomes smaller. When field image signals in large motion consecutively come in, the magnitude of the average value becomes larger. Since the threshold value adaptively varies in this way, the occurrent of the above erroneous determination is substantially minimized.

Figure 6:
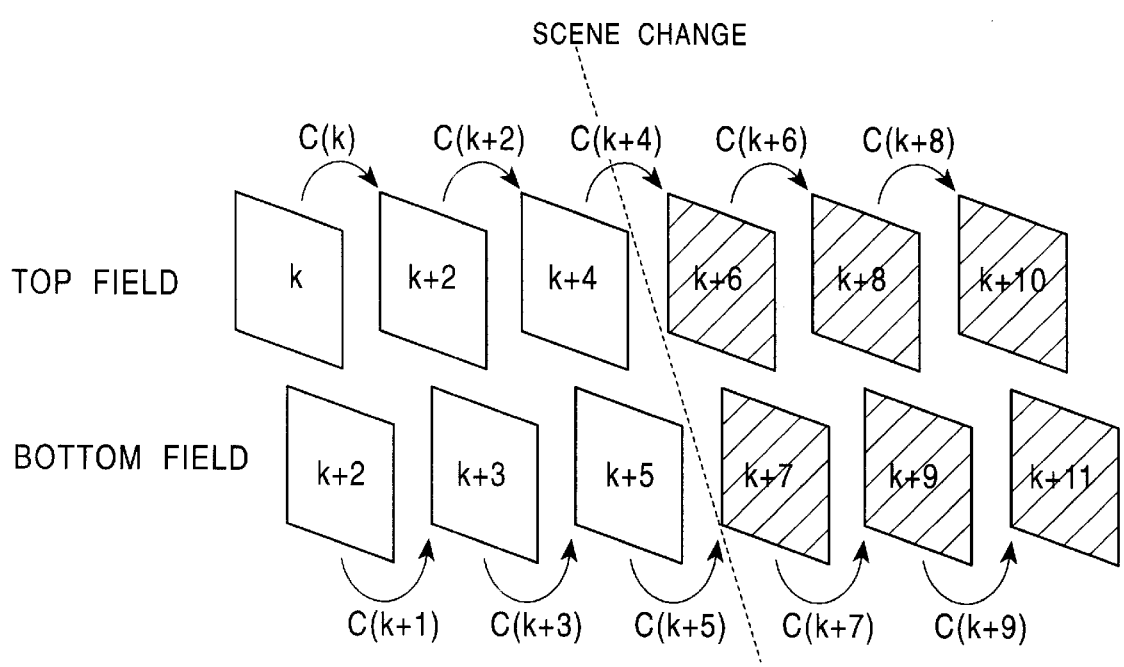
FIG. 6 is an explanatory diagram showing an image in which a scene change occurs.
Figure 7:
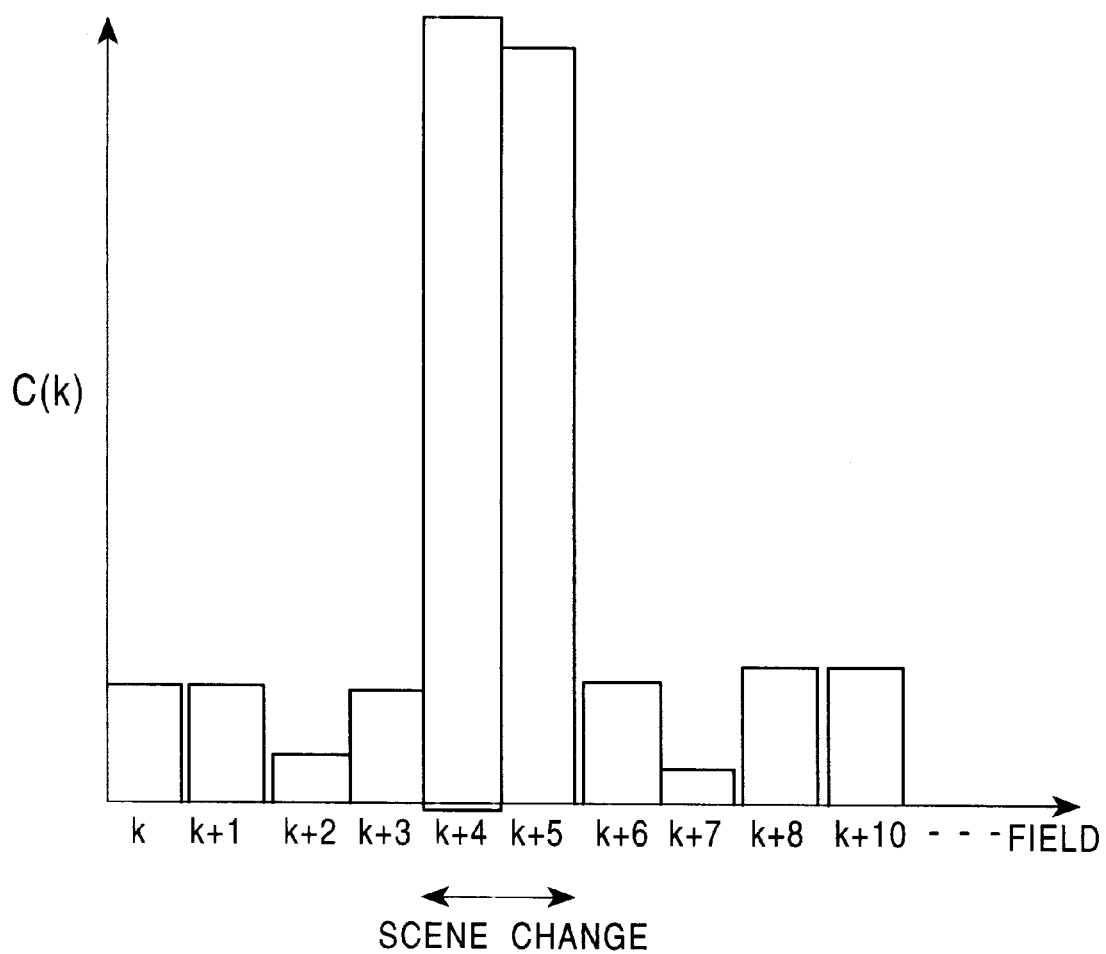
FIG. 7 illustrates identity information C(i) when a scene change occurs in an image.

When a scene change takes place in the field image signal as shown in FIG. 6, the identity information C(i) sharply increases at the scene change. Referring to FIG. 6, blank boxes are those prior to the scene change and Ehatched boxes are those subsequent to the scene change. The identity information C(k+4) of a (k+4)-th field and the identity information C(k+5) of a (k+5)-th field immediately prior to the scene change are extremely larger than the identity information of the fields prior to and subsequent to these fields.

If a scene change takes place, the average value AVE_C of the identity information (also referred to as mean identity information) will increase even if no motion in the field images signal exists between the fields prior to and the fields subsequent to the scene change in extreme cases.

If the threshold value is increased with no motion between the field image signals, the determination of the repeat field image will possibly be subject to error, which is should be avoided.

The accumulator 15 removes the identity information C thus increased due to the scene change to compute the average identity information AVE_C.

To this end, a scene change detector 18 for detecting a scene change is provided as shown by dotted lines in FIG. 2.

The scene change detector 18 references the field memory group 11 to detect a scene change.

Figure 8:
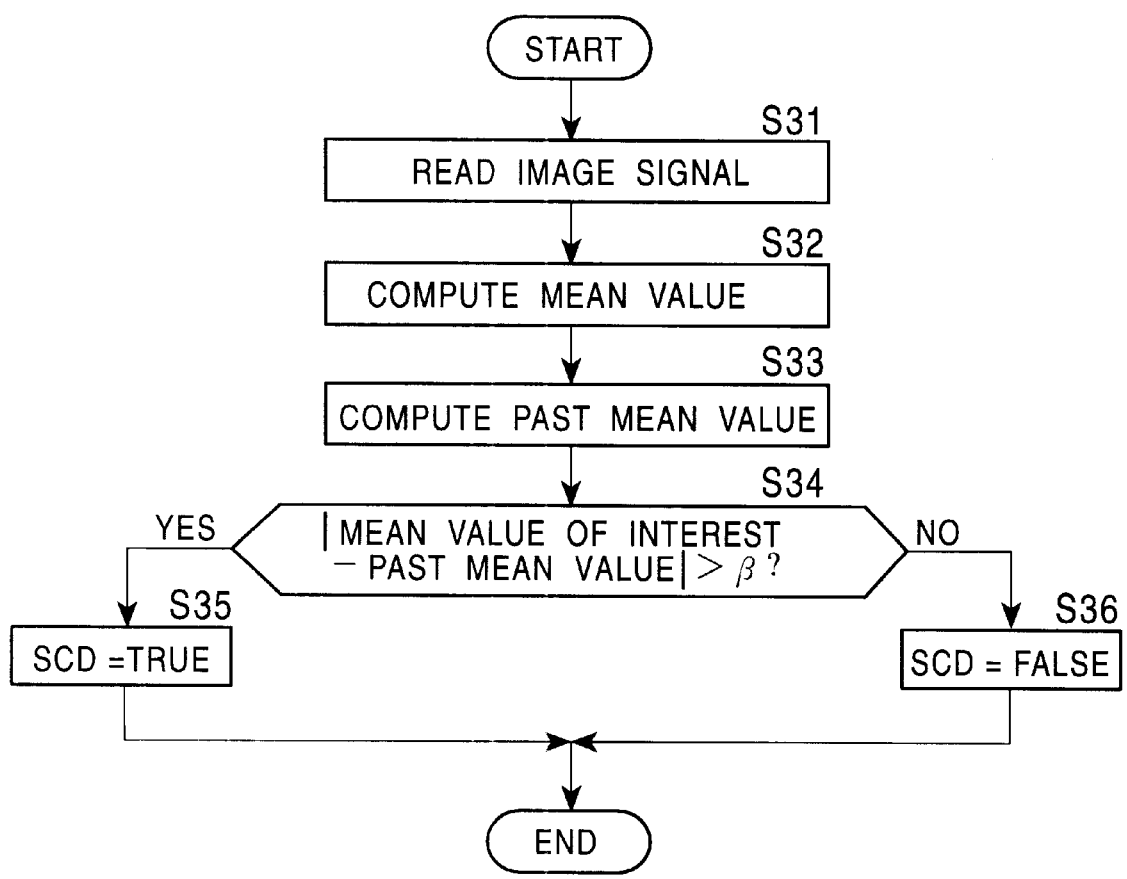
FIG. 8 is a flow diagram showing the process by a scene change detector 18 of FIG. 2.

More particularly, the scene change detector 18 performs a process shown in FIG. 8 each time the field image signal of a top field is stored in the field memory $11_{N+1}$.

In step S31, the field image signals are read from the field memories $11N+_1$ and $11_{N+2}$ as those of a field of interest. Field image signals constituting some past frames prior to the field of interest are read from the field memory group 11 in step S31 as well. In step S32, the average of luminance, for example, is computed on a per field basis based on the frames that are read in step S31.

In step S33, the averages of luminance over some past frames prior to the frame of interest are averaged to compute past average value. The process goes to step S34, where a determination is made of whether the differential (differential absolute value) between the average value of luminance of the frame of interest and the past average value of luminance is greater than (alternatively, equal to or greater than) a predetermined constant β. When it is determined in step S34 that the differential between the average value of luminance of the frame of interest and the past average value is greater than the predetermined constant β, more particularly, when a scene change takes place between the frame of interest and the frame immediately prior to the frame of interest, the process goes to step S35. A variable SCD indicating whether a scene change is present or absent is set to TRUE to indicate that a scene change has occurred, and is fed to memories $14_N$ and $14_{N-1}$ to end the process.

When it is determined in step S34 that the differential between the average value of luminance of the frame of interest and the past average value is not greater than the predetermined constant β, more particularly, when no scene change takes place between the frame of interest and the frame immediately prior to the frame of interest, the process goes to step S36. The variable SCD is set to FALSE to indicate that no scene change has occurred, and is fed to memories $14_N$ and $14_{N-1}$ to end the process.

The variable SCD fed to memories $14_N$ and $14_{N-1}$ are respectively associated with the identity information C(N) and C(N-1) already stored therein.

The variable SCD associated with the identity information C(i) is hereinafter referred to as scene change information SCD(i).

Figure 9:
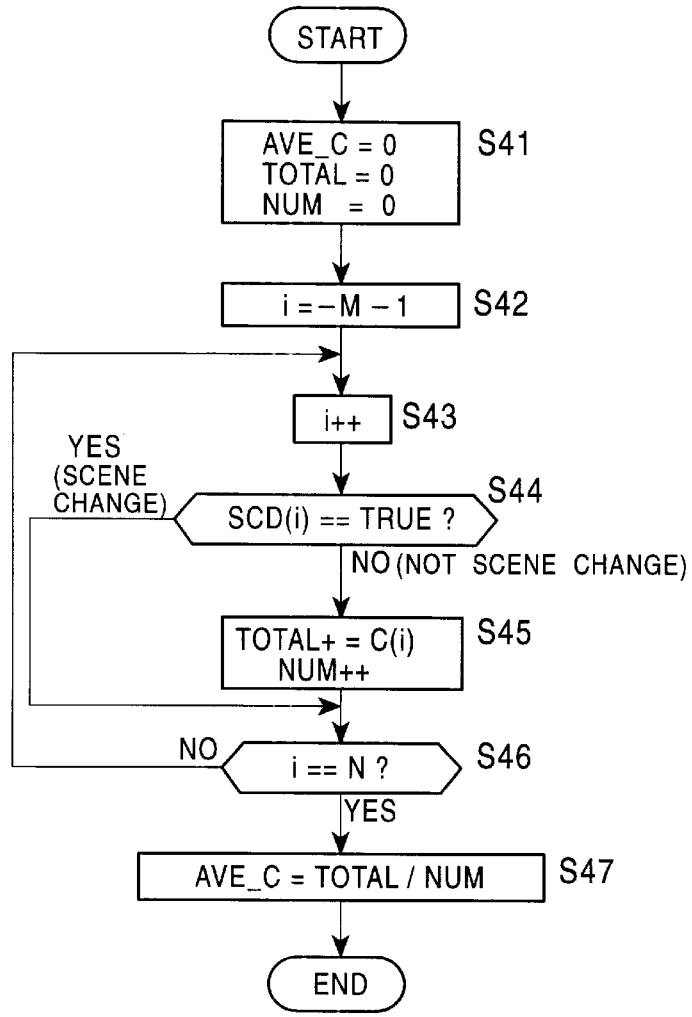
FIG. 9 is a flow diagram showing the process by the accumulator 15 of FIG. 2.

The accumulator 15 performs a process shown in FIG. 9 while referencing the memory group 14, and computes the average identity information AVE_C.

In step S41, variables AVE_C and TOTAL are set to Os as their initial values in the same manner as in step S21 in FIG. 5. A variable NUM that is the number of pieces of identity information C(i) used in the computation of the average value is set to 0 as its initial value. In step S42, the variable i is set to −M-1 as its initial value.

In step S43, the variable i is incremented by 1, and the process goes to step S44, where a determination is made of whether the scene change information SCD(i) is TRUE. When it is determined in step S44 that the scene change information SCD(i) is not TRUE, more particularly, when no scene change has taken place immediately subsequent to the frame constructed by the field image signal corresponding to the identity information C(i), the process goes to step S45. The identity information C(i) is added to the variable TOTAL, and the addition result is freshly stored in the variable TOTAL. In step S45, the variable NUM is incremented by 1, causing the process to go to step S46.

When it is determined in step S44 that the scene change information SCD(i) is TRUE, more particularly, when a scene change has taken place immediately subsequent to the frame constructed by the field image signal corresponding to the identity information C(i), the process goes to step S46 skipping step S45.

Among a plurality of pieces of identity information stored in the memory group 14, the identity information of all fields excluding the fields constituting any frame which is immediately followed by a scene change is summed to be set in the variable TOTAL, and the number of pieces of the identity information considered in the variable TOTAL is set in the variable NUM.

It is determined in step S46 whether the variable i is equal to N. When it is determined in step S46 that the variable i is not N, the process returns to step S43. When it is determined in step S46 that the variable i is equal to N, the process goes to step S47. The variable TOTAL is divided by the variable NUM, and the division result is set in the variable AVE_C to end the process.

The accumulator 15 performs the above process each time new identity information C(N) is stored in memory $14_N$.

Scene change detection is not limited to the above method. Alternatively, a scene change may be detected by referencing the identity information C(i) stored in the memory group 14.

Figure 10:
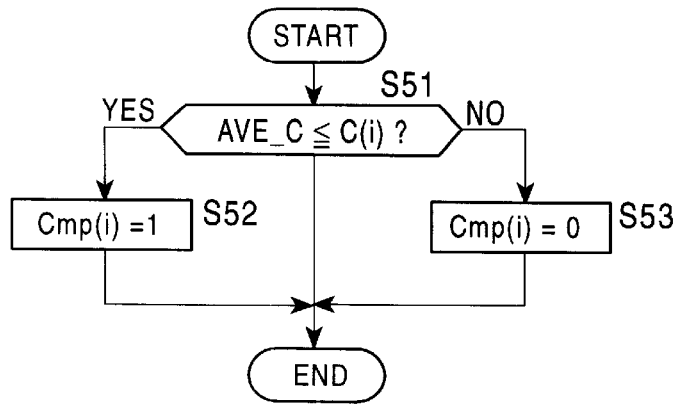
FIG. 10 is a flow diagram showing the process by a comparator $16_i$ of FIG. 2.

Referring to a flow diagram shown in FIG. 10, the process by the comparators $16_0$ through $16_N$ shown in FIG. 2 is now discussed.

The comparator $16_i$ performs the process shown in FIG. 10 each time the new identity information C(N) is stored in the memory $14_N$, and the resulting comparative information Cmp(i) is fed to the pattern determining unit 17.

The comparator $16_i$ reads the identity information C(i) from the memory $14_i$. In step S51, the identity information C(i) read is compared with the average identity information AVE_C read from the accumulator 15. When the identity information C(i) is equal to or greater than (alternatively, greater than) the average identity information AVE_C, the process goes to step S52 from step S51. Set as the comparative information Cmp(i) is a low probability figure indicating that the probability of the field image signal, following two fields behind the field stored in the field memory $11_i$, being a repeat field is low; for example, the comparative information Cmp(i) is set to 1. This ends the process.

When the identity information C(i) is smaller than (or equal to or smaller) the average identity information AVE_C, the process goes to step S53 from step S51. Set as the comparative information Cmp(i) is a high probability figure indicating that the probability of the field image signal, following two fields behind the field stored in the field memory $11_i$, being a repeat field is high; for example, the comparative information Cmp(i) is set to 0. This ends the process.

The process by the pattern determining unit 17 shown in FIG. 2 is discussed in detail. Before the discussion, the arrangement pattern of fields (also referred to as pulldown pattern) in the 2-3 pulldown processed image signal is first described.

Four patterns 1 through 4 in different combinations of fields are available as the pulldown patterns of the 2-3 pulldown processed image signal as shown in FIG. 11.

Figure 11A:
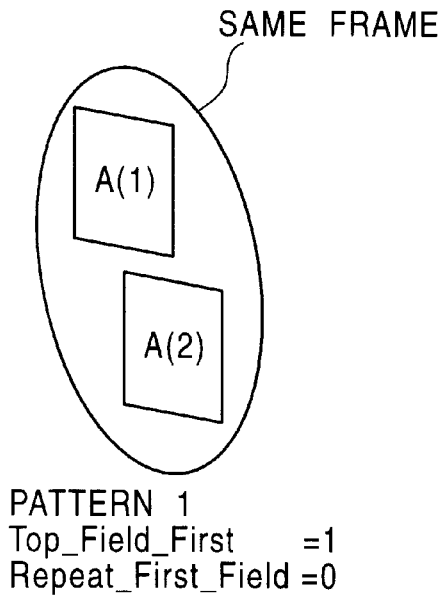
FIGS. 11A–11D illustrate pulldown patterns.
Figure 11B:
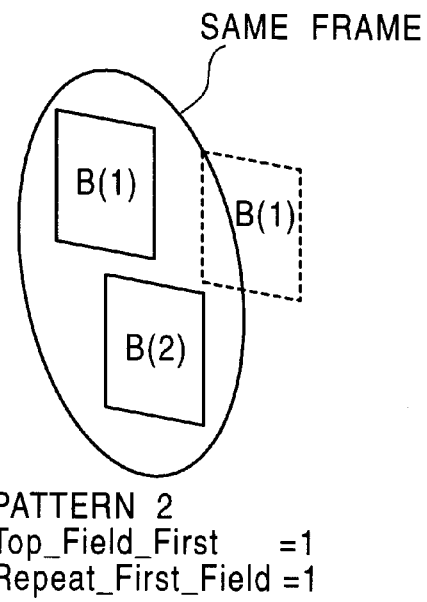
Figure 11C:
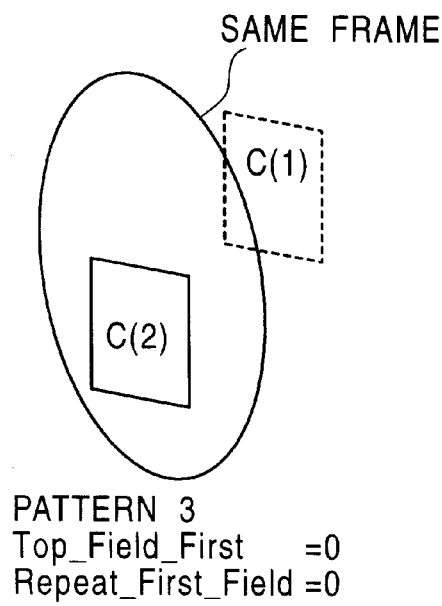
Figure 11D:
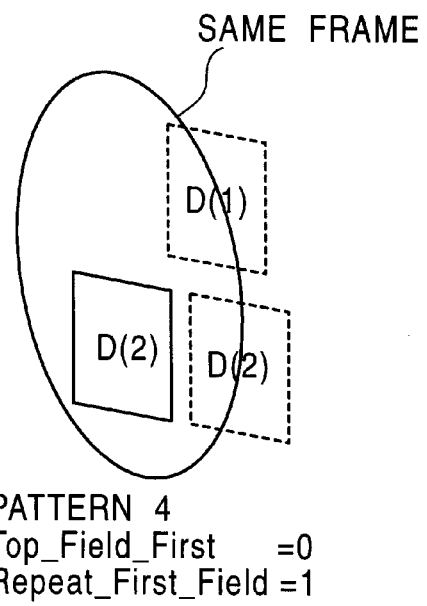

In the pattern 1, one frame of the image signal is constructed of the top field A(1) and the bottom field A(2) of one frame of film as shown in FIG. 11A. In the pattern 2, one frame of the image signal is constructed of the top field B(1) and the bottom field B(2) of one frame of film and the next frame of the image signal is constructed of the top field B(1) as shown in FIG. 11B. In the pattern 3, the bottom field of one frame of the image signal is constructed of the bottom field C(2) of one frame of film while the top field of the next frame of the image signal is constructed of the top field C(1) of film as shown in FIG. 11C. In the pattern 4, the bottom field of one frame of the image signal is constructed of the bottom field D(2) of one frame of film while the top field of the next frame of the image signal is constructed of the top field D(1) of film and the bottom field of the next frame of the image signal is constructed of the bottom field D(2), as shown in FIG. 11D.

The pulldown pattern of the 2-3 pulldown processed image signal is expressed by a combination of flags TFF (Top_Field_First) and RFF(Repeat_First_Field) specified in the picture layer in the MPEG2 standard. These flags are output as already described repeat information.

The flag TFF indicates which of the top field and bottom field is first presented. When the top field or the bottom field is output (presented), the flag is set to 1 or 0, respectively. In the patterns 1 and 2, the flag TFF is set to 1 while in patterns 3 and 4 the flag TFF is set to 0.

The flag RFF indicates whether the first presented field is presented again two fields later. Depending on the field presented or not presented, the flag RFF is set to 1 or 0, respectively. In the patterns 1 and 3, the flag RFF is set to 0 while in the patterns 2 and 4 the flag RFF is set to 1.

From the above discussion, the patterns 1 through 4 are expressed in combinations of flags TFF and RFF (TFF,RFF) as follows: (1,0), (1,1), (0,0), and (0,1), respectively.

In the pulldown patterns 1 through 4, patterns that follow a given pattern are limited.

Figure 12:
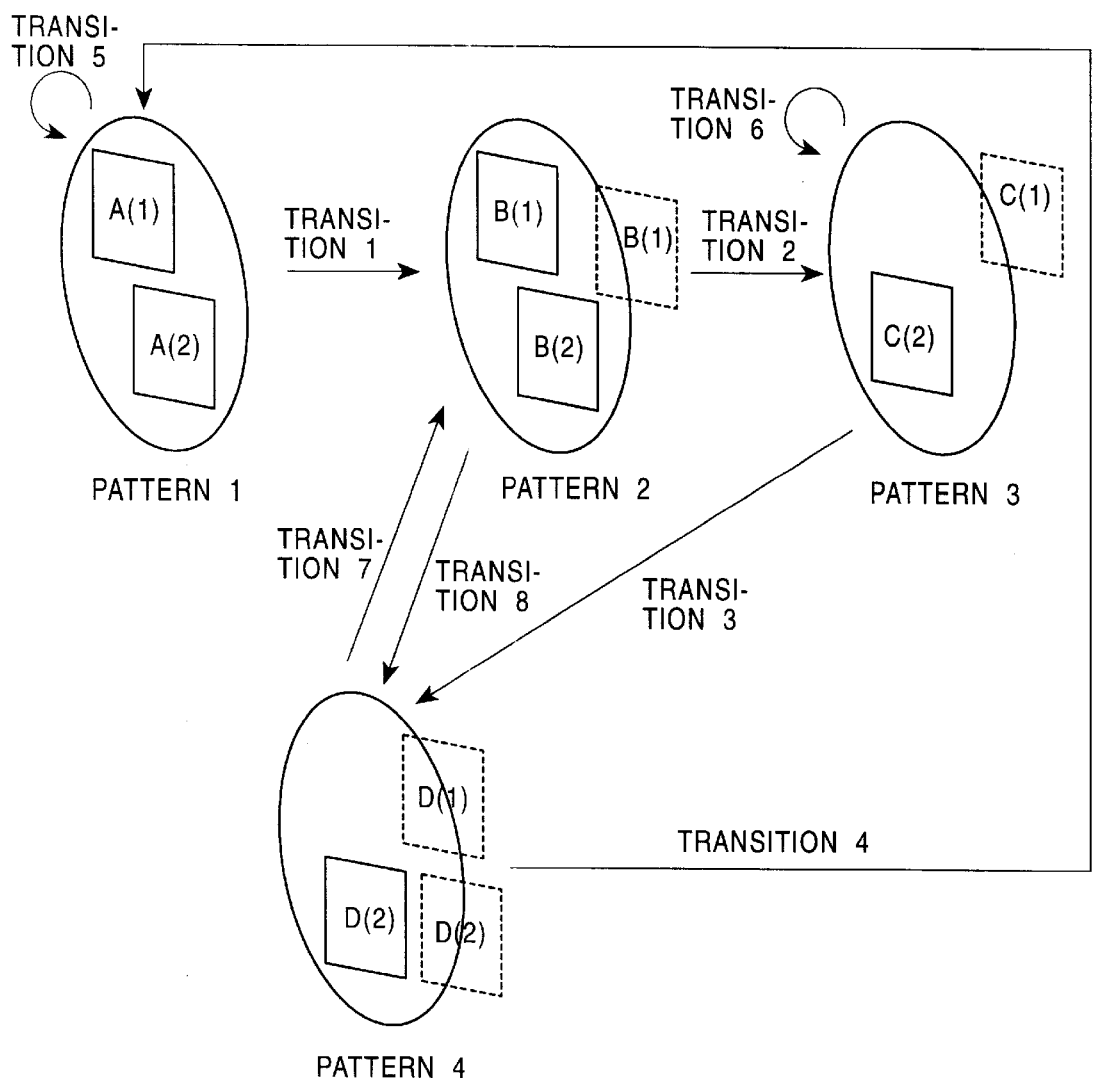
FIG. 12 illustrates the transition of pulldown patterns.

FIG. 12 is a transition chart that illustrates the patterns which each of the patterns 1 through 4 takes (after its own pattern).

Figure 13:
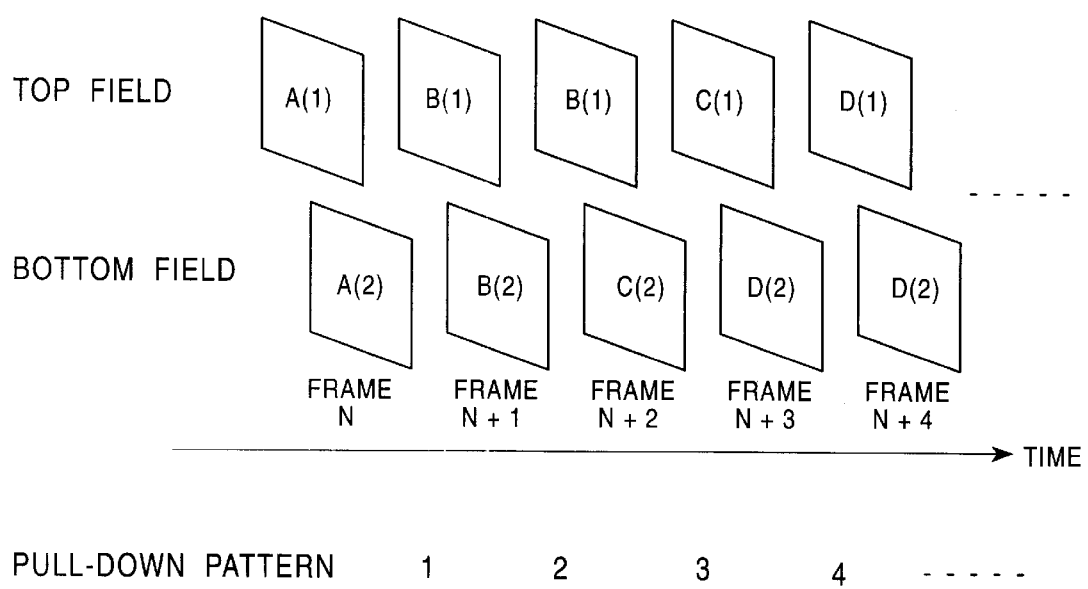
FIG. 13 illustrates pulldown patterns of a 2-3 pulldown processed image.

The 2-3 pulldown processed image signal takes patterns 1, 2, 3, 4, 1, . . . in that order. As a result, a set of patterns 1, 2, 3, and 4 are repeatedly arranged as a unit, as shown in FIG. 13.

On the other hand, as shown in FIG. 12, the pattern 1 is permitted to transition to itself in a transition 5 besides to the pattern 2 in a transition 1. The pattern 2 is permitted to transition to the pattern 4 in a transition 8 besides to the pattern 3 in a transition 2. The pattern 3 is permitted to transition to itself in a pattern 6 besides to the pattern 4 in a transition 3. The pattern 4 is permitted to transition to the pattern 2 in a transition 7 besides to the pattern 1 in a transition 4. In the 2-3 pulldown processed image signal, the transitions 5 through 8 may take place when an editing or the like is performed.

When an (i+2)-th field is a repeat field of an i-th field, the identity information C(i) is ideally 0, and is equal to or smaller than the threshold (average identity information) AVE_C. The comparative information Cmp(i) is thus 0. When the (i+2)-th field is not a repeat field of the i-th field, the identity information C(i) is greater than the threshold AVE_Cin principle, and the comparative information Cmp(i) is thus 1.

Determining the criterion (detection condition) of whether the comparative information Cmp(i) is 0 or 1 determines whether the (i+2)-th field is a repeat field in principle.

As already described, the comparative information Cmp(i) is obtained by adaptively varying the threshold value AVE_C used in the comparator $16_i$. With the comparative information Cmp(i) alone, the repeat field is detected at a relatively high accuracy.

That the comparative information Cmp(i) is error-free cannot be guaranteed, however.

Based on a plurality of pieces of comparative information Cmp(O) through Cmp(N) supplied by the comparators $16_0$ through $16_N$, the pattern determining unit 17 determines which of the patterns 1 through 4 is taken by the field image stored in the field memory $11_0$ and detects the repeat field. More particularly, the patterns 2 and 4 include a repeat field, and the pattern determining unit 17 determines whether the field image stored in the field memory $11_0$ is one of the patterns 2 and 4. When the field image stored in the field memory $11_0$ is one of the patterns 2 and 4, the field image following two fields behind, namely, the field image stored in the field memory $11_2$ is detected as a repeat field.

The determination of the pulldown pattern in the 2-3 pulldown processed image signal may be performed as described below.

Figure 14:
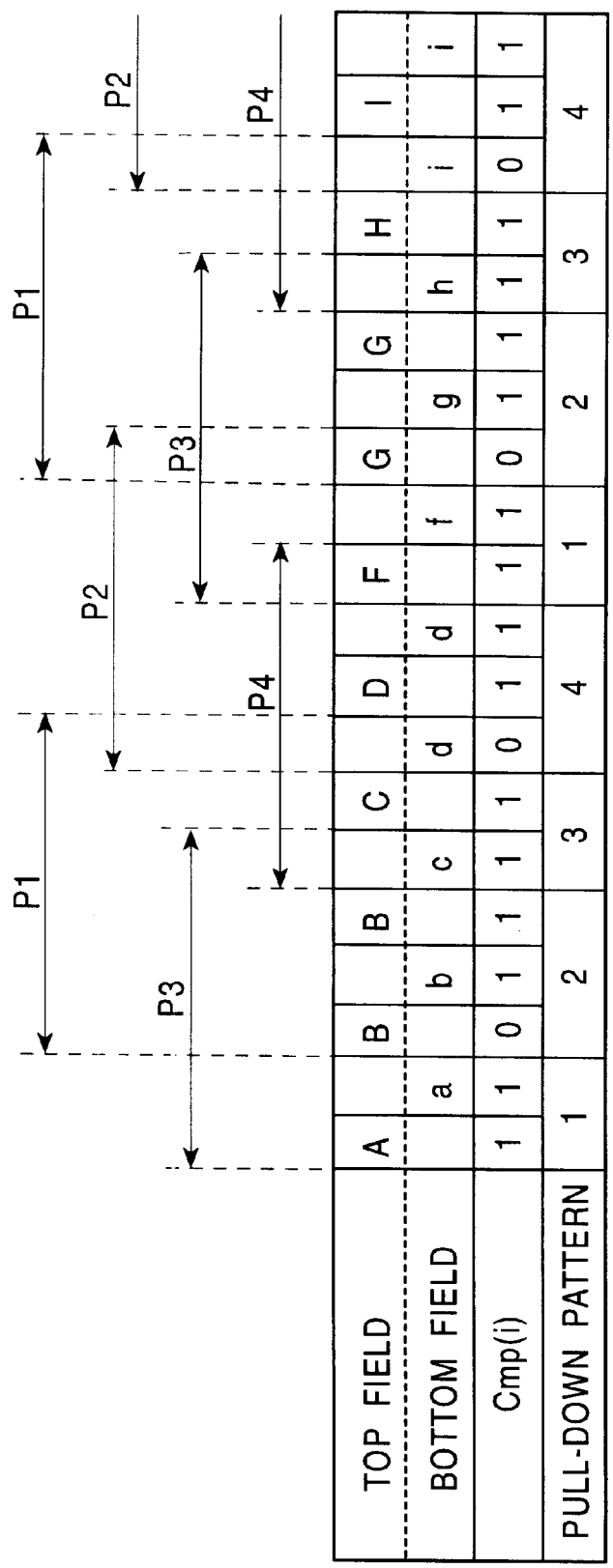
FIG. 14 illustrates the relationship of the sequence of the 2-3 pulldown processed image signal (field), comparative information Cmp(i), and pulldown pattern.

FIG. 14 illustrates an ideal relationship of the sequence of the 2-3 pulldown processed image signal (field), comparative information Cmp(i), and pulldown pattern.

As shown in FIG. 14, each field is designated by respective letter, and identical images are designated by the same letters. Uppercase letters denote top fields while lower case letters denote bottom fields.

The relationship of comparative information Cmp(5) through Cmp(5) for consecutive six fields and pulldown patterns with N=5 is now considered.

Focusing ranges P1 and P2 in FIG. 14, comparative information within these ranges contains Cmp(0)=0, Cmp(1)=1, Cmp(2)=1, Cmp(3)=1, Cmp(4)=1, and Cmp(5)=0.

This sequence of fields is taken by the six pieces of comparative information Cmp(0) through Cmp(5) in the 2-3 pulldown processed signal, namely the comparative Cmp(0) of the field image signal stored in the field memory 110, and the comparative information Cmp(1) through Cmp(5) of the field image signals (stored in the field memories $11_1$ through $11_5$) of all fields through to the field following five fields behind, when the field image signal corresponding to the comparative information Cmp(0) constitutes the initial field of one of the pulldown patterns 2 and 4 as shown in FIG. 14.

Within the range P1 shown in FIG. 14, the field image signals B, G, . . . corresponding to the comparative information Cmp(0) constitute top fields, and within the range P2, the field image signals d, i, . . . corresponding to the comparative information Cmp(0) constitute bottom fields.

In the case of comparative information Cmp(0)=0, Cmp(1)=1, Cmp(2)=1, Cmp(3)=1, Cmp(4)=1, and Cmp(5)=0 as listed in a first data row in a table in FIG. 15, when the field image signal corresponding to the comparative information Cmp(0) constructs a top field or bottom field, the field image signal is determined to constitute the initial field of one of the pulldown patterns 2 and 4.

Focusing ranges P3 and P4 in FIG. 14, comparative information within these ranges contains Cmp(0)=1, Cmp(1)=1, Cmp(2)=0, Cmp(3)=1, Cmp(4)=1, and Cmp(5)=1.

This sequence of fields is taken by the six pieces of comparative information Cmp(0) through Cmp(5) in the 2-3 pulldown processed signal, when the field image signal corresponding to the comparative information Cmp(0) constitutes the initial field of one of the pulldown patterns 1 and 3 as shown in FIG. 14.

Within the range P3 shown in FIG. 14, the field image signals A, F, . . . corresponding to the comparative information Cmp(0) constitute top fields, and within the range P4, the field image signals c, h, . . . corresponding to the comparative information Cmp(0) constitute bottom fields.

In the case of comparative information Cmp(0)=1, Cmp(1)=1, Cmp(2)=0, Cmp(3)=1, Cmp(4)=1, and Cmp(5)=1 as listed in a second data row in the table in FIG. 15, when the field image signal corresponding to the comparative information Cmp(0) constructs a top field or bottom field, the field image signal is determined to constitute the initial field of one of the pulldown patterns 1 and 3.

When the field image signal corresponding to the comparative information Cmp(0) is determined to constitute the initial field of pulldown pattern 2 or 4, the field following two fields behind is a repeat field.

Rather than determining the repeat field from a single piece of comparative information Cmp(0) that is 0 or 1, a plurality of pieces of comparative information are used to determine a pulldown pattern, and a repeat field is determined based on the determined pulldown pattern. The erroneous repeat field detection is thus substantially reduced.

In the above case, the repeat field is detected only when a predetermined sequence of the six pieces of comparative information Cmp(0) through Cmp(5) is arranged as specified (here Cmp(0)=0, Cmp(1)=1, Cmp(2)=1, Cmp(3)=1, Cmp(4)=1, and Cmp(5)=0). In other words, no repeat field will be detected if any one of the six pieces of comparative information Cmp(0) through Cmp(5) is in error.

Comparing with the case where the repeat field is determined solely dependent on the single piece of comparative information Cmp(0), the detection criterion for detecting the repeat field is rigorous. As a result, the erroneous repeat field detection is substantially reduced.

Generally speaking, the more the number of pieces of comparative information referenced, the less the probability of erroneous detection of the repeat field.

Figure 16:
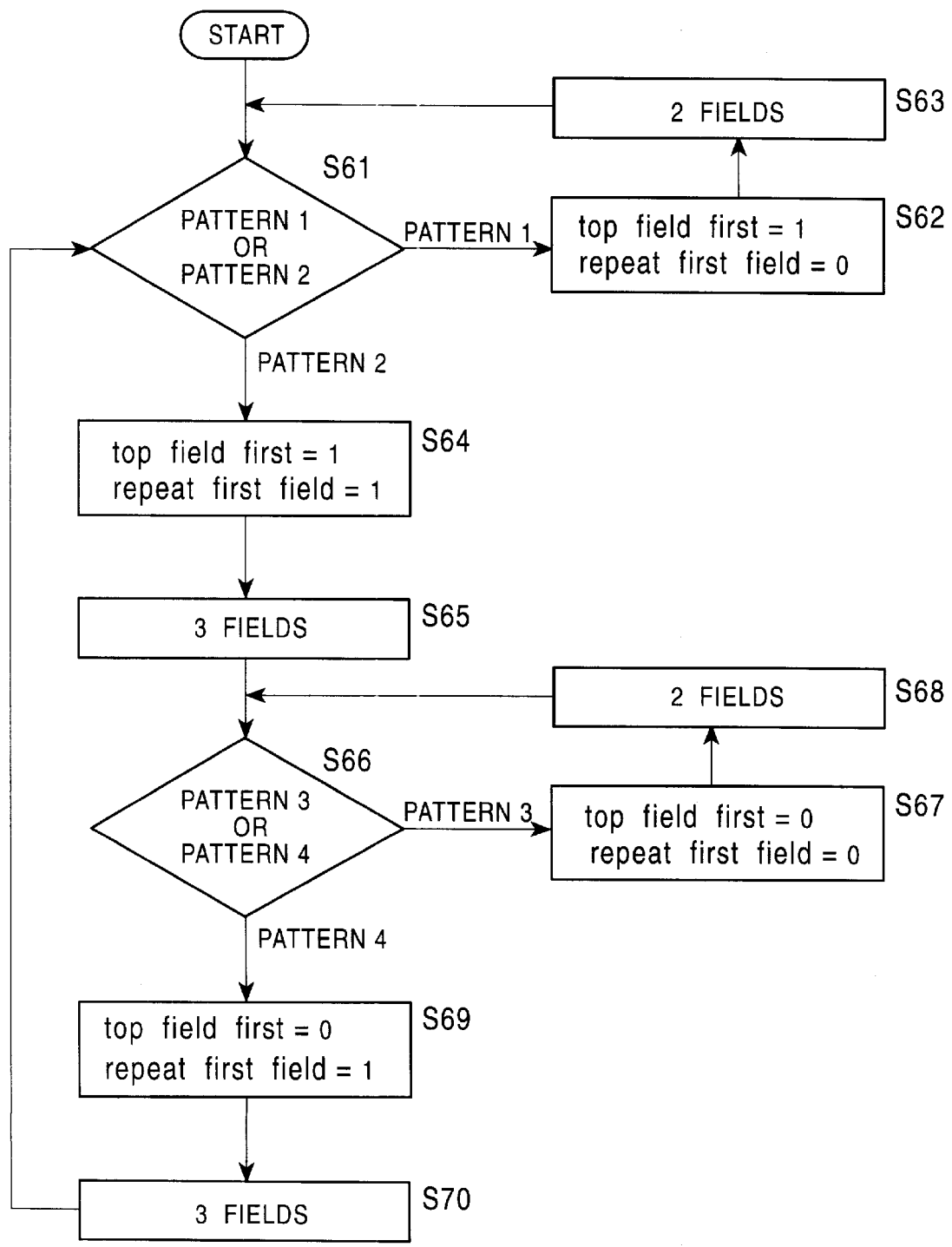
FIG. 16 is a flow diagram showing the process by a pattern determining unit 17 of FIG. 2.

Referring to a flow diagram shown in FIG. 16, the operation of the pattern determining unit 17 shown in FIG. 2 to determine the pulldown pattern for the detection of the repeat field is now discussed. For the following discussion, it is assumed that the field image signal constituting the initial field (top field) of the pattern 1 is first input to the pulldown detector circuit 1.

The pattern determining unit 17 determines from the comparative information Cmp(0) through Cmp(5) in step S61 whether the pulldown pattern is the pattern 1 or 2. When it is determined in step S61 that the pulldown pattern is the pattern 1, more particularly, when the comparative information is a sequence of Cmp(0)=1, Cmp(1)=1, Cmp(2)=0, Cmp(3)=1, Cmp(4)=1, and Cmp(5)=1 as listed in the second data row in the table in FIG. 15 and when the field image (of interest) stored in the memory $11_0$ (also referred to as current field image) is a top field, the process goes to step S62. As shown in FIG. 11, the flag TFF and RFF are set to 1 and 0, respectively, and the flag thus set are fed as the repeat information to the field/frame converter circuit 2.

In step S63, the pattern determining unit 17 waits until two field image signals constituting the pattern 1 (see FIG. 11) are read from the field memory group 11, namely from field memories $11_0$ and $11_1$, and then returns to step S61.

The process in step S61 is performed after determining in step S61 that the pulldown pattern is the pattern 1 and after determining in step S66 that the pulldown pattern is the pattern 4.

The process in step S61 is performed after the pulldown pattern is determined to be pattern 1 or 4. As already described with reference to FIG. 12, pulldown patterns that possibly appear in succession to the pattern 1 or 4 may be the pattern 1 or 2. In step S61, it is sufficient to determine whether the pulldown pattern is the pattern 1 or 2, with no need to consider patterns 3 and 4 in determination.

When it is determined in step S61 that the pulldown pattern is the pattern 2, more particularly, when the comparative information is a sequence of Cmp(0)=0, Cmp(1)=1, Cmp(2)=1, Cmp(3)=1, Cmp(4)=1, and Cmp(5)=0 as listed in the first data row in the table in FIG. 15 and when the current field image is a top field, the process goes to step S64. As shown in FIG. 11, the flag TFF are RFF respectively are set to 1, and the flags thus set are fed as the repeat information to the field/frame converter circuit 2.

In step S65, the pattern determining unit 17 waits until three field image signals constituting the pattern 2 (see FIG. 11) are read from the field memory group 11, namely from field memories $11_0$ and $11_2$, and then goes to step S66.

It is determined from the comparative information Cmp(0) through Cmp(5) in step S66 whether the pulldown pattern is the pattern 3 or 4. When it is determined in step S66 that the pulldown pattern is the pattern 3, more particularly, when the comparative information is a sequence of Cmp(0)=1, Cmp(1)=1, Cmp(2)=0, Cmp(3)=1, Cmp(4)=1, and Cmp(5)=1 as listed in the second data row in the table in FIG. 15 and when the current field image is a bottom field, the process goes to step S67. As shown in FIG. 11, the flag TFF are RFF respectively are set to 0, and the flags thus set are fed as the repeat information to the field/frame converter circuit 2.

In step S68, the pattern determining unit 17 waits until two field image signals constituting the pattern 3 (see FIG. 11) are read from the field memory group 11, namely from field memories $11_0$ and $11_1$, and then returns to step S66.

The process in step S66 is performed after determining in step S61 that the pulldown pattern is the pattern 2 and after determining in step S66 that the pulldown pattern is the pattern 3.

The process in step S66 is performed after the pulldown pattern is determined to be pattern 2 or 3. As already described with reference to FIG. 12, pulldown patterns that possibly appear in succession to the pattern 2 or 3 may be the pattern 3 or 4. In step S66, it is sufficient to determine whether the pulldown pattern is the pattern 3 or 4, with no need to consider patterns 1 and 2 in determination.

When it is determined in step S66 that the pulldown pattern is the pattern 4, more particularly, when the comparative information is a sequence of Cmp(0)=0, Cmp(1)=1, Cmp(2)=1, Cmp(3)=1, Cmp(4)=1, and Cmp(5)=0 as listed in the first data row in the table in FIG. 15 and when the current field image is a bottom field, the process goes to step S69. As shown in FIG. 11, the flag TFF are RFF are set to 0 and 1, respectively, and the flags thus set are fed as the repeat information to the field/frame converter circuit 2.

In step S70, the pattern determining unit 17 waits until three field image signals constituting the pattern 4 (see FIG. 11) are read from the field memory group 11, namely from field memories $11_0$ and $11_2$, and then returns to step S61.

The flag RFF indicates whether a first presented field is presented again two fields later. The flag RFF set to 1 shows that a repeat field is detected.

The probability of erroneous detection of the repeat field is reduced by referencing a plurality of pieces of comparative information Cmp(0) through Cmp(5) as described with reference to FIG. 16. There are times when the detection period is stable, more particularly, when the cycle of patterns 1, 2, 3, and 4 are repeated in the pulldown pattern in the 2-3 pulldown processed image signal. In such a case, the detection criterion set to be more rigorous may cause the field image signal of an actual repeat field to escape detection if any one of the plurality of pieces of comparative information Cmp(0) through Cmp(5) is in error.

When the detection period for detecting repeat field is stable, relaxing the detection criterion results in a better result than tightening the criterion. More particularly, when the detection period for detecting repeat field is stable, the detection of repeat field using a single piece of comparative information Cmp(0) only will better serve the purpose of avoiding (reducing) unsuccessful detection of an actual repeat field.

On the other hand, when the detection period for detecting repeat field is unstable, more particularly, when the pulldown pattern is not cyclic in such an order as patterns 1, 2, 3, 4, 1, 2, . . . , the comparative information Cmp(0) may be mistaken for 0, though it is actually 1, with the detection criterion left relaxed. A field that is actually not a repeat field may be erroneously detected as a repeat field.

From the above discussion, when the detection period for detecting the repeat field is stable, the detection criterion is relaxed; and when the detection period for detection the repeat field is unstable, the detection criterion is tightened. This arrangement reduces the probability of erroneous detection in which repeat fields escape detection and non-repeat fields are detected as a repeat field.

Figure 17:
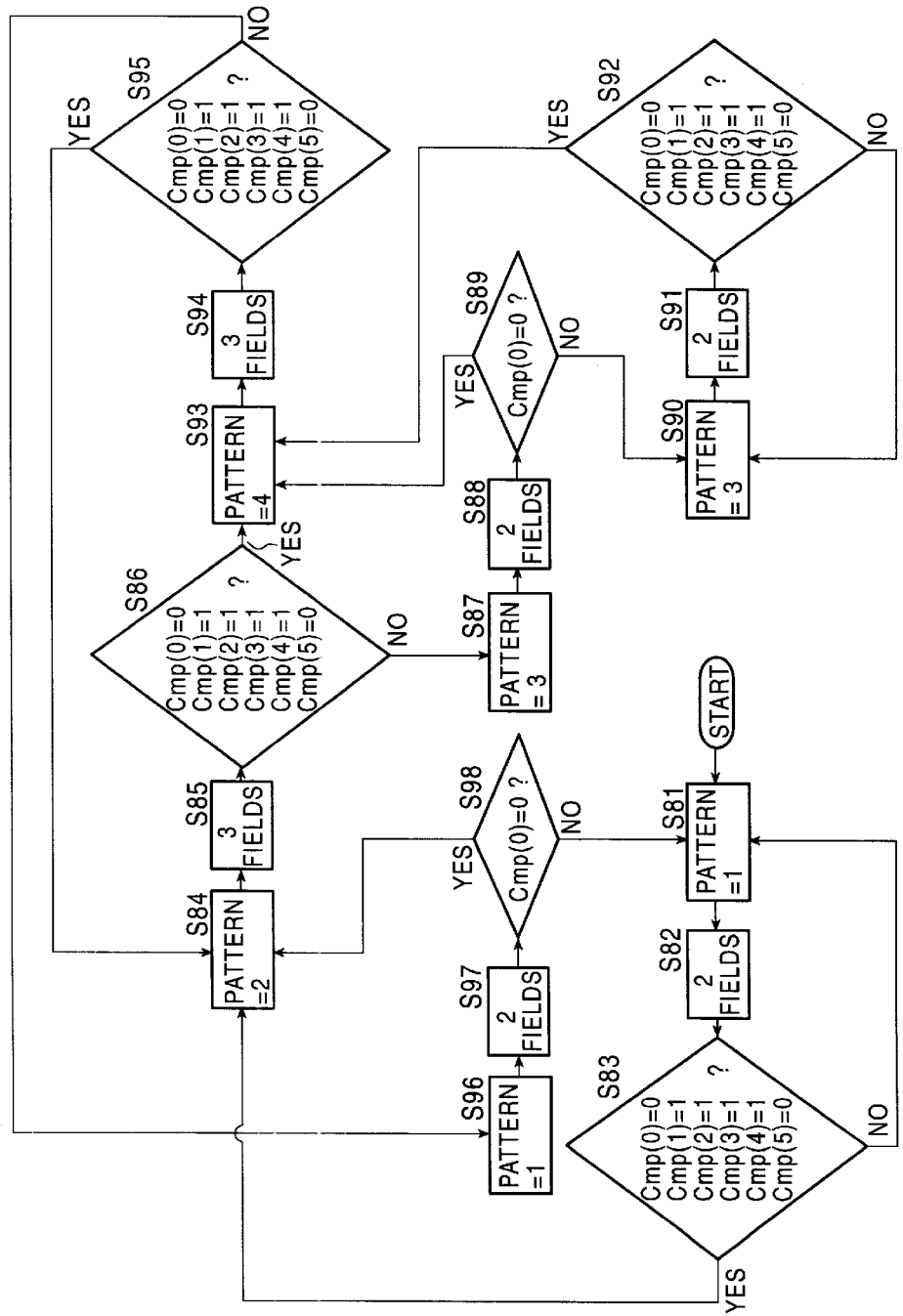
FIG. 17 is a flow diagram showing the process by the pattern determining unit 17 of FIG. 2.

Referring to a flow diagram shown in FIG. 17, the process by the pattern determining unit 17 shown in FIG. 2 is discussed. In this process, the detection criterion is changed in the course of the repeat field detection depending on whether the detection period for the detection of the repeat field is stable or unstable.

For the following discussion, it is again assumed that the field image signal constituting the initial field (top field) of the pattern 1 is first input to the pulldown detector circuit 1.

The pattern determining unit 17 in step S81 determines that the pulldown pattern is the pattern 1, sets the flags TFF and RFF to 1 and 0, respectively, and feeds the set flags as the repeat information to the field/frame converter circuit 2. The process goes to step S82. The pattern determining unit 17 waits until two field image signals constituting the pattern 1 are read from the field memory group 11, namely from field memories $11_0$ and $11_1$, and then goes to step S83. The pattern determining unit 17 determines whether the comparative information is a sequence of Cmp(0)=0, Cmp(1)=1, Cmp(2)=1, Cmp(3)=1, Cmp(4)=1, and Cmp(5)=0.

When it is determined in step S83 that the comparative information is not a sequence of Cmp(0)=0, Cmp(1)=1, Cmp(2)=1, Cmp(3)=1, Cmp(4)=1, and Cmp(5)=0, the pattern determining unit 17 returns to step S81. When it is determined in step S83 that the comparative information is a sequence of Cmp(0)=0, Cmp(1)=1, Cmp(2)=1, Cmp(3)=1, Cmp(4)=1, and Cmp(5)=0, more particularly, when the fields following two fields and seven fields behind the current field are a repeat field with the fields following three to six fields behind the current field being not a repeat field, the process goes to step S84. The pulldown pattern is determined to be the pattern 2, and the flags TFF and RFF are respectively set to 1, and are then fed as the repeat information to the field/frame converter circuit 2.

In step S85, the pattern determining unit 17 waits until three field image signals constituting the pattern 2 are read from the field memory group 11, namely from field memories $11_0$ and $11_2$, and then goes to step S86. In the same manner as in step S83, it is determined in step S86 whether the comparative information is a sequence of Cmp(0)=0, Cmp(1)=1, Cmp(2)=1, Cmp(3)=1, Cmp(4)=1, and Cmp(5)=0.

When it is determined in step S86 that the comparative information is a sequence of Cmp(0)=0, Cmp(1)=1, Cmp(2)=1, Cmp(3)=1, Cmp(4)=1, and Cmp(5)=0, the process goes to step S93. When it is determined in step S86 that the comparative information is not a sequence of Cmp(0)=0, Cmp(1)=1, Cmp(2)=1, Cmp(3)=1, Cmp(4)=1, and Cmp(5)=0, the process goes to step S87. The pulldown pattern is determined to be the pattern 3, and the flags TFF and RFF are respectively set to 0, and are then fed as the repeat information to the field/frame converter circuit 2.

In step S88, the pattern determining unit 17 waits until two field image signals constituting the pattern 3 are read from the field memory group 11 and then goes to step S89.

It is determined in step S89 whether the comparative information Cmp(0) is 0. When it is determined in step S89 that the comparative information Cmp(0) is 0, the process goes to step S93. When it is determined in step S89 that the comparative information Cmp(0) is not 0, the process goes to step S90. In the same manner as in step S87, the pulldown pattern is determined to be the pattern 3, and the flags TFF and RFF are respectively set to 0, and are then fed as the repeat information to the field/frame converter circuit 2.

In step S91, the pattern determining unit 17 waits until two field image signals constituting the pattern 3 are read from the field memory group 11, and then goes to step S92.

In the same manner as in step S83, it is determined in step S92 whether the comparative information is a sequence of Cmp(0)=0, Cmp(1)=1, Cmp(2)=1, Cmp(3)=1, Cmp(4)=1, and Cmp(5)=0.

When it is determined in step S92 that the comparative information is not a sequence of Cmp(0)=0, Cmp(1)=1, Cmp(2)=1, Cmp(3)=1, Cmp(4)=1, and Cmp(5)=0, the process returns to step S90. When it is determined in step S92 that the comparative information is a sequence of Cmp(0)=0, Cmp(1)=1, Cmp(2)=1, Cmp(3)=1, Cmp(4)=1, and Cmp(5)=0, the process goes to step S93. The pulldown pattern is determined to be the pattern 4, and the flags TFF and RFF are set to 0 and 1, respectively, and are then fed as the repeat information to the field/frame converter circuit 2.

In step S94, the pattern determining unit 17 waits until three field image signals constituting the pattern 4 are read from the field memory group 11, and then goes to step S95.

In step S95, it is again determined whether the comparative information is a sequence of Cmp(0)=0, Cmp(1)=1, Cmp(2)=1, Cmp(3)=1, Cmp(4)=1, and Cmp(5)=0.

When it is determined in step S95 that the comparative information is a sequence of Cmp(0)=0, Cmp(1)=1, Cmp(2)=1, Cmp(3)=1, Cmp(4)=1, and Cmp(5)=0, the process returns to step S84. When it is determined in step S95 that the comparative information is not a sequence of Cmp(0)=0, Cmp(1)=1, Cmp(2)=1, Cmp(3)=1, Cmp(4)=1, and Cmp(5)=0, the process goes to step S96. The pulldown pattern is determined to be the pattern 1, and the flags TFF and RFF are set to 1 and 0, respectively, and are then fed as the repeat information to the field/frame converter circuit 2.

In step S97, the pattern determining unit 17 waits until two field image signals constituting the pattern 1 are read from the field memory group 11, and then goes to step S98.

In the same manner as in step S89, it is determined in step S98 whether the comparative information Cmp(0) is 0. When it is determined in step S98 that the comparative information Cmp(0) is 0, the process returns to step S84. When it is determined in step S98 that the comparative information Cmp(0) is not 0, the process returns to step S81.

When the detection period for detecting the repeat field in the 2-3 pulldown processed image signal is stable in the flow diagram shown in FIG. 17, more particularly, the pulldown pattern is a cycle of patterns 1, 2, 3, 4, 1, . . . , the process cycles through steps S84, S85, S86, S87, S88, S89, S93, S94, S95, S96, S97, S98, S84, . . .

After the pulldown pattern is determined to be the pattern 1 in step S96, the succeeding pulldown pattern is determined by simply referencing the comparative information Cmp(0) in step S98. If the Cmp(0) is 0, the pulldown pattern is determined to be the pattern 2, and the initial field constituting the pattern 2 is detected as a repeat field.

The detection criterion for detecting the repeat field is thus relaxed.

The pulldown pattern is determined by referencing the six pieces of comparative information Cmp(0) through Cmp(5) in step S86. More particularly, if the comparative information is a sequence of Cmp(0)=0, Cmp(1)=1, Cmp(2)=1, Cmp(3)=1, Cmp(4)=1, and Cmp(5)=0, the pulldown pattern is determined to be the pattern 4 (step S93). If it is not, the pulldown pattern is determined to be the pattern 3 (step S87).

In the case of a stable detection period for detecting the repeat field, to recognize the pulldown pattern transition from the pattern 2 to 3 in a regular transition, the six pieces of comparative information have to be different from a sequence of Cmp(0)=0, Cmp(1)=1, Cmp(2)=1, Cmp(3)=1, Cmp(4)=1, and Cmp(5)=0 (in any single piece of information).

Also, in the case of the stable detection period, to recognize the pulldown pattern transition from the pattern 2 to 4 in an unusual transition rather than the regular transition from the pattern 2 to 3, the six pieces of comparative information have to be exactly a sequence of Cmp(0)=0, Cmp(1)=1, Cmp(2)=1, Cmp(3)=1, Cmp(4)=1, and Cmp(5)=0.

After the pulldown pattern is determined to be the pattern 3 in step S87, the succeeding pulldown pattern is determined by simply referencing the comparative information Cmp(0) in step S89. If the Cmp(0) is 0, the pulldown pattern is determined to be the pattern 4, and the initial field constituting the pattern 4 is detected as a repeat field.

The detection criterion for detecting the repeat field is thus relaxed.

The pulldown pattern is determined by referencing the six pieces of comparative information Cmp(0) through Cmp(5) in step S95. More particularly, if the comparative information is a sequence of Cmp(0)=0, Cmp(1)=1, Cmp(2)=1, Cmp(3)=1, Cmp(4)=1, and Cmp(5)=0, the pulldown pattern is determined to be the pattern 2 (step S84). If it is not, the pulldown pattern is determined to be the pattern 1 (step S96).

In the case of a stable detection period for detecting the repeat field, to recognize the pulldown pattern transition from the pattern 4 to 1 in a regular transition, the six pieces of comparative information have to be different from a sequence of Cmp(0)=0, Cmp(1)=1, Cmp(2)=1, Cmp(3)=1, Cmp(4)=1, and Cmp(5)=0 (in any single piece of information).

Also, in the case of the stable detection period, to recognize the pulldown pattern transition from the pattern 4 to 2 in an unusual transition rather than the regular transition from the pattern 4 to 1, the six pieces of comparative information have to be exactly a sequence of Cmp(0)=0, Cmp(1)=1, Cmp(2)=1, Cmp(3)=1, Cmp(4)=1, and Cmp(5)=0.

When the detection period for detecting the repeat field is stable, the detection criterion is relaxed. The criterion for recognizing the unusual transition is tightened under such a condition that the detection period for detecting the repeat field is disturbed. This arrangement reduces the probability of erroneous detection in which repeat fields escape detection and non-repeat fields are erroneously detected as a repeat field.

In the flow diagram shown in FIG. 17, when the repeat field is not detected at the timing a repeat field should come in, more particularly, when the comparative information Cmp(0) is not 0 in step S89 or S98, the detection period for detecting the repeat field in the 2-3 pulldown processed image signal is considered as being unstable.

When it is determined in step S98 that the comparative information Cmp(0) is not 0, steps S81 through S83 are repeated until the six pieces of comparative information become Cmp(0)=0, Cmp(1)=1, Cmp(2)=1, Cmp(3)=1, Cmp(4)=1, and Cmp(5)=0. Meanwhile, the pulldown pattern is continuously determined to be the pattern 1. At the moment the six pieces of comparative information become Cmp(0)=0, Cmp(1)=1, Cmp(2)=1, Cmp(3)=1, Cmp(4)=1, and Cmp(5)=0, the pulldown pattern is determined to be the pattern 2 in step S84. In this case, the initial field constituting the pattern 2 is detected as a repeat field.

When the detection period for detecting the repeat field is unstable, the detection criterion is tightened. More particularly, the criterion for recognizing the transition from the pattern 1 to 2 in the regular transition of the 2-3 pulldown processed signal is tightened.

In contrast, the criterion for recognizing a transition from the pattern 1 to itself in an unusual transition is relaxed.

Likewise, when it is determined in step S89 that the comparative information Cmp(0) is not 0, steps S90 through S92 are repeated until the six pieces of comparative information become Cmp(0)=0, Cmp(1)=1, Cmp(2)=1, Cmp(3)=1, Cmp(4)=1, and Cmp(5)=0. Meanwhile, the pulldown pattern is continuously determined to be the pattern 3. At the moment the six pieces of comparative information become Cmp(0)=0, Cmp(1)=1, Cmp(2)=1, Cmp(3)=1, Cmp(4)=1, and Cmp(5)=0, the pulldown pattern is determined to be the pattern 4 in step S93. In this case, the initial field constituting the pattern 4 is detected as a repeat field.

When the detection period for detecting the repeat field is unstable, the detection criterion is tightened. Furthermore, the criterion for recognizing the unusual transition is relaxed. This arrangement reduces the probability of erroneous detection in which repeat fields escape detection and non-repeat fields are erroneously detected as a repeat field.

Since the detection criterion is tightened or relaxed (the number of pieces of comparative information referenced is changed) depending on whether the detection period for detecting the repeat field is stable or unstable, the repeat field that would be otherwise difficult to detect will be detected. Even when a video editing changes the output period of the repeat field, such a change will be immediately tracked to reduce erroneous repeat field detection.

When the detection period of the repeat field becomes unstable, a plurality of pieces of comparative information including those for future fields are constantly used to recognize the pulldown pattern. Even when an editing changes the output period of the repeat field, a repeat field will be detected immediately subsequent to such a change.

The 2-3 pulldown processed signal is constructed of repeated pulldown patterns, each being a cycle of patterns 1, 2, 3, and 4. When editing steps, each on a per several fields basis, are consecutively made, or when the image signal includes the one in which one frame (two fields) of film is converted into three fields of image signal, the patterns 2 and 4 are repeated alternately for a long period of time as shown in FIG. 18.

According to the process shown in the flow diagram in FIG. 17, steps S81 through S83 are repeated after it is determined in step S98 that the comparative information Cmp(0) is not 0; or steps S90 through S92 are repeated after it is determined in step 89 that the comparative information Cmp(0) is not 0. As a result, the pattern 1 or 3 is erroneously recognized as consecutively appearing.

The pattern determining unit 17 shown in FIG. 2 examines what pulldown pattern is repeated when the detection period of the repeat field remains unstable for a long period of time (steps S81–S83 and steps S90–S92 are repeated by a predetermined count), and modifies the number of pieces of comparative information referenced (to increase or decrease it) to fit in the detection of a repeated pulldown pattern when such a pulldown pattern is repeated above a predetermined frequency.

Figure 18:
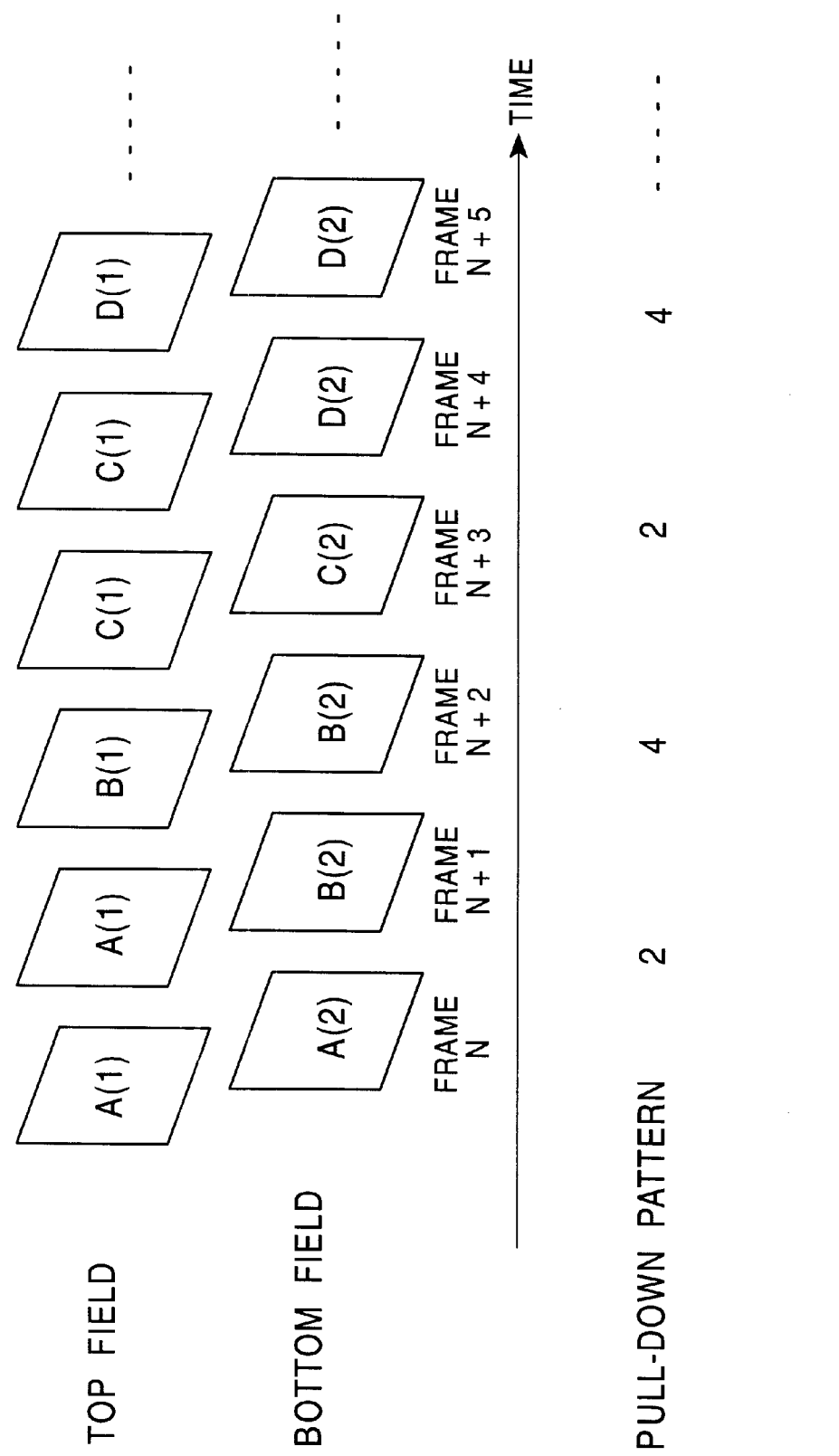
FIG. 18 illustrates a repeat of a special pulldown.

For example, when the patterns 2 and 4 are alternatingly repeated as shown in FIG. 18, the sequence of the comparative information Cmp(1) output by the comparator group 16 is as shown in FIG. 19 like in FIG. 14. In this case, as shown in FIG. 20, if a total of four pieces of comparative information including the comparative information Cmp(0) for the current field, and comparative information Cmp(1), Cmp(2) and Cmp(3) for the fields preceding one to three fields ahead of the current field are Cmp(0)=0, Cmp(1)=1, Cmp(2)=1, and Cmp(3)=0and if the current field image (field of interest) is a top field or a bottom field, the current field image is the initial field constituting the pattern 2 or 4.

The pattern determining unit 17 examines what pulldown pattern is repeated when the detection period of the repeat field remains unstable for a long period of time, and modifies the number of pieces of comparative information referenced from six to four (six pieces of comparative information Cmp(0) through Cmp(5) to four pieces of comparative information Cmp(0) through Cmp(3) when the patterns 2 and 4 are repeated above a certain frequency. The pattern determining unit 17 performs the process illustrated in a flow diagram shown in FIG. 21.

Steps S101 through S118 work essentially in the same manner as in steps S81 through S98 in FIG. 17. In steps S103, S106, S112 and S115, four pieces of comparative information Cmp(0) through Cmp(3) rather than six pieces of comparative information Cmp(0) through Cmp(5) are checked to determine whether they match Cmp(0)=0, Cmp(1)=1, Cmp(2)=1, and Cmp(3)=0.

Figure 21:
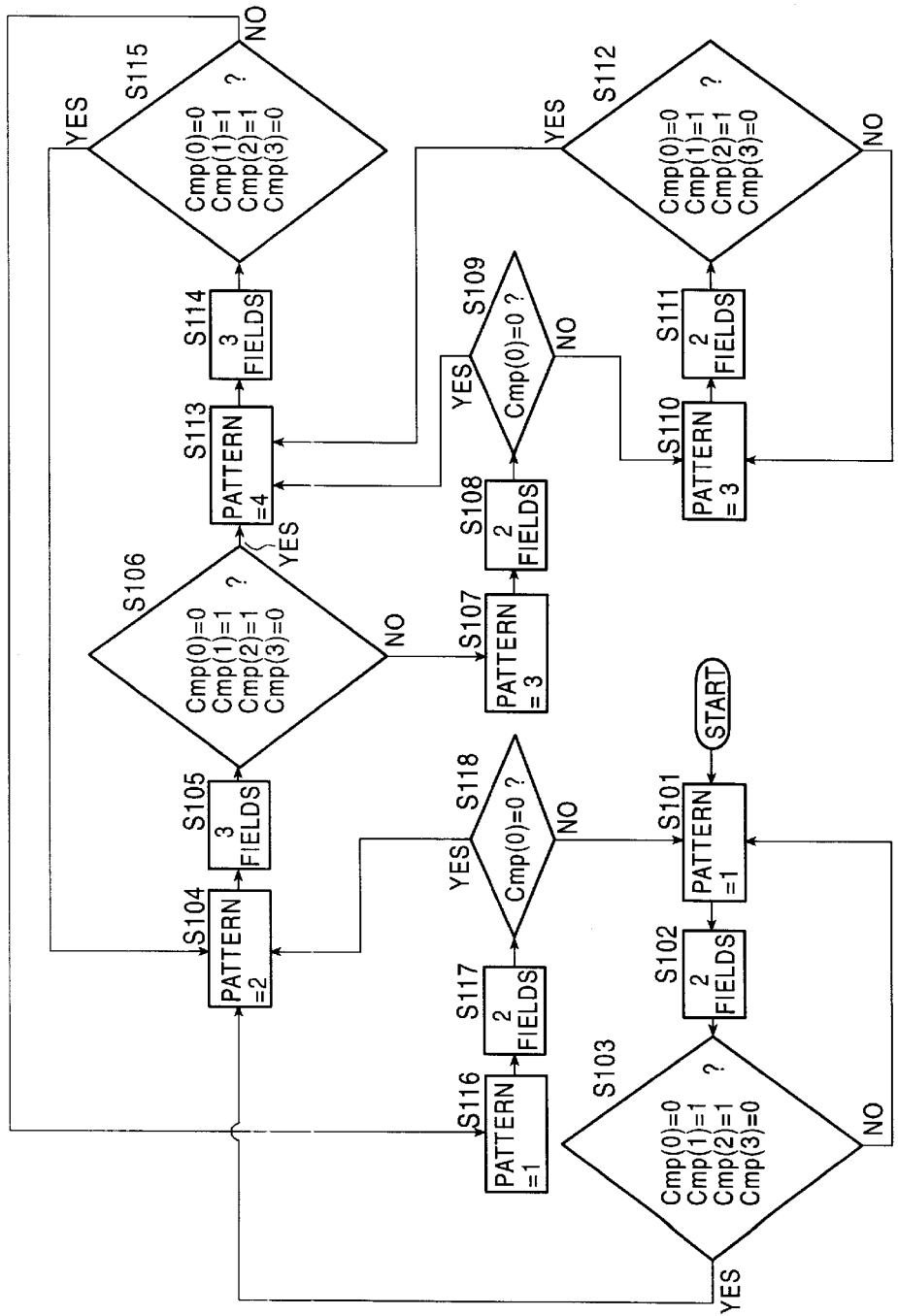
FIG. 21 is a flow diagram showing the process by the pattern determining unit 17 of FIG. 2.

For the present discussion, the image signal having a repeat field every five fields, namely, the 2-3 pulldown processed image signal is assumed. Since the alternatingly repeated patterns 2 and 4 fall within the unstable detection period category, the patterns 2 and 4 are determined to repeat alternatingly only when comparative information is as Cmp(0)=0, Cmp(1)=1, Cmp(2)=1, and Cmp(3)=0 as shown in FIG. 21 (steps S104, S105, S106, S113, S114, S115, S104, . . . are repeated). More particularly, to recognize an unusual transition from pattern 2 to pattern 4 or from pattern 4 to pattern 2, four pieces of comparative information have to be Cmp(0)=0, Cmp(1)=1, Cmp(2)=1, and Cmp(3)=0.

In this way, the repeat field can be detected even when a sequence of alternatingly repeated patterns 2 and 4 is included in the 2-3 pulldown processed image signal.

When the patterns 1 and 3 are recognized above a certain frequency after the start of referencing four pieces of comparative information Cmp(0) through Cmp(3), the pattern determining unit 17 reference back the six pieces of comparative information Cmp(0) through Cmp(5) to perform the process illustrated in the flow diagram in FIG. 17.

Figure 22:
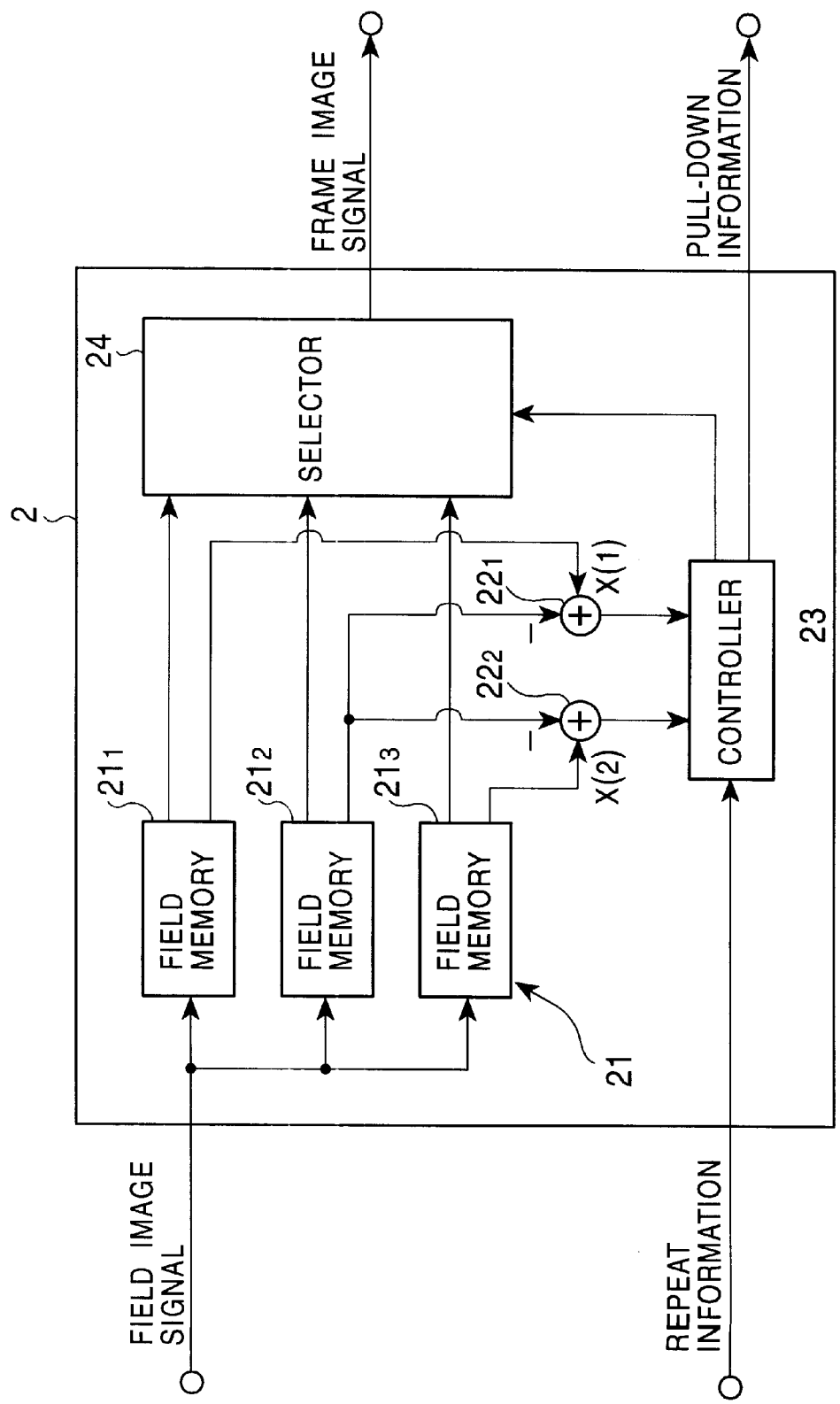
FIG. 22 is a block diagram showing a field/frame converter circuit 2 of FIG. 1.

FIG. 22 is a block diagram showing a field/frame converter circuit 2 of FIG. 1.

The field image signal and repeat information output by the pulldown detector circuit 1 are respectively fed to a field memory group 21 and a controller 23.

The field memory group 21 is constructed of three field memories $21_1$ through $21_3$, and stores the field image signal from the pulldown detector circuit 1 according to the unit of pulldown pattern construction.

More particularly, when the pulldown pattern is the pattern 1 or 3, the pulldown detector circuit 1 (pattern determining unit 17) outputs the field image signal for two fields constituting the pulldown pattern, along with the repeat information. In the field memory group 21, an initial field (also referred to as field 1) and a second field (also referred to as field 2) constituting the pulldown pattern may be respectively stored in the field memories $21_1$ and $21_2$.

When the pulldown pattern is the pattern 2 or 4, the pulldown detector circuit 1 outputs the field image signal for three fields constituting the pulldown pattern, along with the repeat information. In the field memory group 21, an initial field (also referred to as field 1), a second field (also referred to as field 2), and a third field (also referred to as field 3) constituting the pulldown pattern may be respectively stored in the field memories $21_1$, $21_2$ and $21_3$.

The controller 23 references the repeat information, and further references the outputs of arithmetic units $22_1$ and $22_2$ to control a selector 24. The controller 23 also outputs the repeat information as pulldown information to the encoder 3 (FIG. 1).

The selector 24, under the control of the controller 23, reads the field image signal stored in the field memory group 21, and arranges the top field on the odd lines and the bottom field on the even lines to construct the frame image signal, and then outputs it to the encoder 3.

The controller 23 references the flags TFF and RFF as the repeat information to determine the pulldown pattern of the field image signal stored in the field memory group 21. When the pulldown pattern of the field image signal stored in the field memory group 21 is the pattern 1 or 3, the controller 23 causes the selector 24 to read the fields 1 and 2 from the field memory group 21. The selector 24 constructs the frame image signal from the fields 1 and 2 read from the field memory group 21 as shown in FIGS. 23A and 23C.

When the pulldown pattern of the field image signal stored in the field memory group 21 is the pattern 2 or 4, the controller 23 causes the selector 24 to select either the field 1 or the field 3, and reads the selected field along with the field 2 from the field memory group 21. The selector 24 constructs the frame image signal as shown in FIGS. 23B and 23D based on the two fields read from the field memory group 21 (the selected field from the fields 1 and 3 plus the field 2).

When the pulldown pattern is the pattern 2 or 4, therefore, when the field 3 is a repeat of the field 1, the field 3, which is a repeat field, is typically deleted. More particularly, the field 1 is always selected from the two fields 1 and 3, and constructs the field image signal together with the field 2.

There are times when the coding efficiency in the succeeding stage encoder 3 is improved under the effect of the time filter by selecting the field 3 rather than the field 1 to construct the frame image signal together with the field 2.

Figure 24:
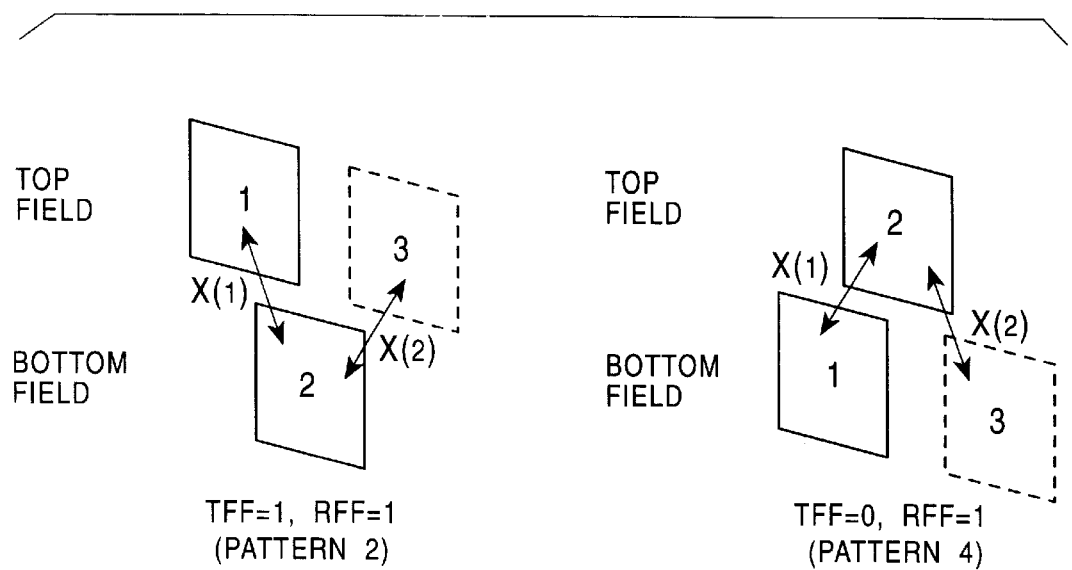
FIG. 24 illustrates the process by a controller 23 of FIG. 22.

When the pulldown pattern is the pattern 2 or 4, the controller 23 causes the arithmetic unit $22_1$ or $22_2$ to compute differential value X(1) in pixel values between the field 1 and the field 2, and differential value X(2) in pixel values between the field 2 and the field 3 as shown in FIG. 24, and causes the selector 24 to select either the field 1 or the field 3 based on the differential values X(1) and X(2), whichever field presents a better coding efficiency.

Figure 25:
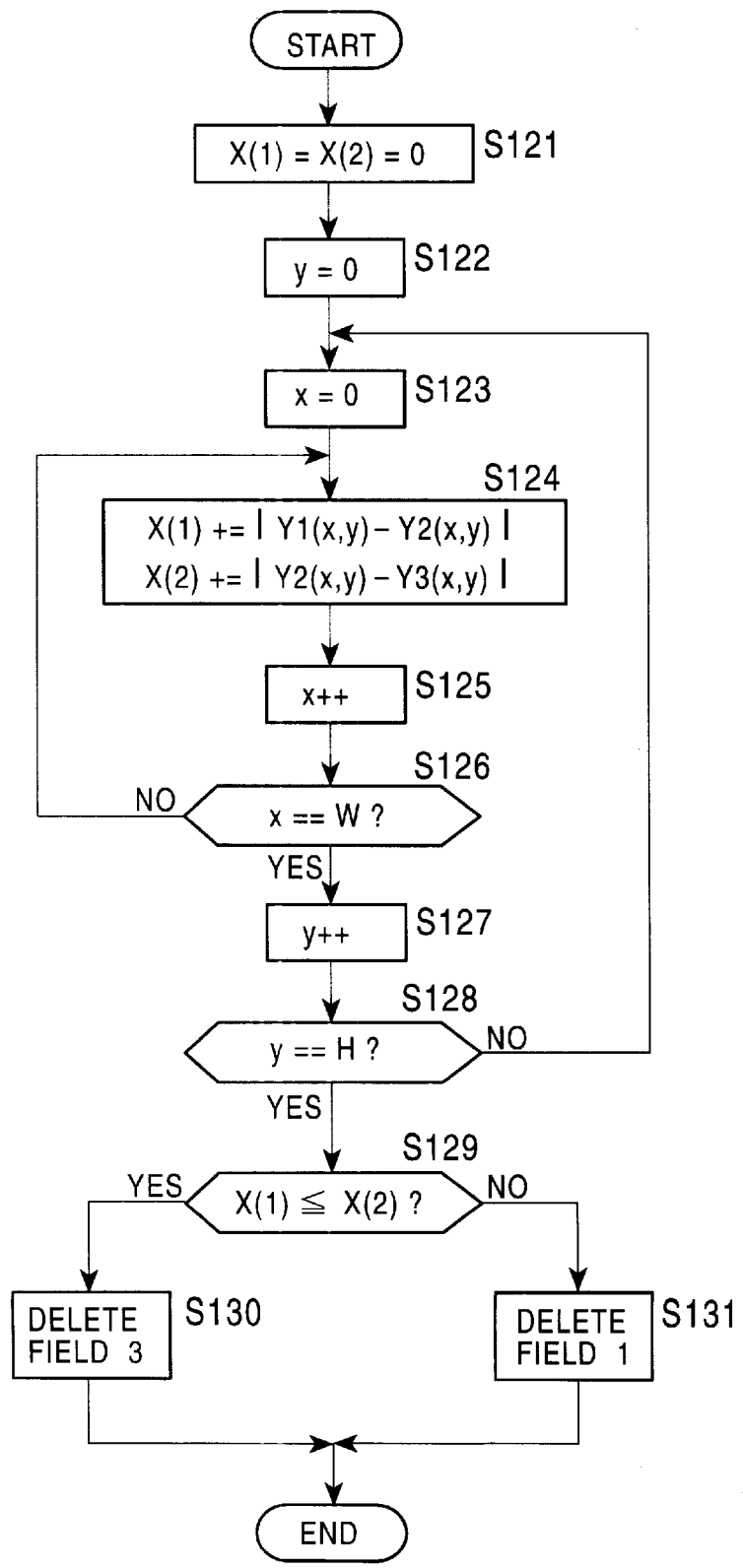
FIG. 25 is a flow diagram showing the process by the controller 23 of FIG. 22.
Figure 26:
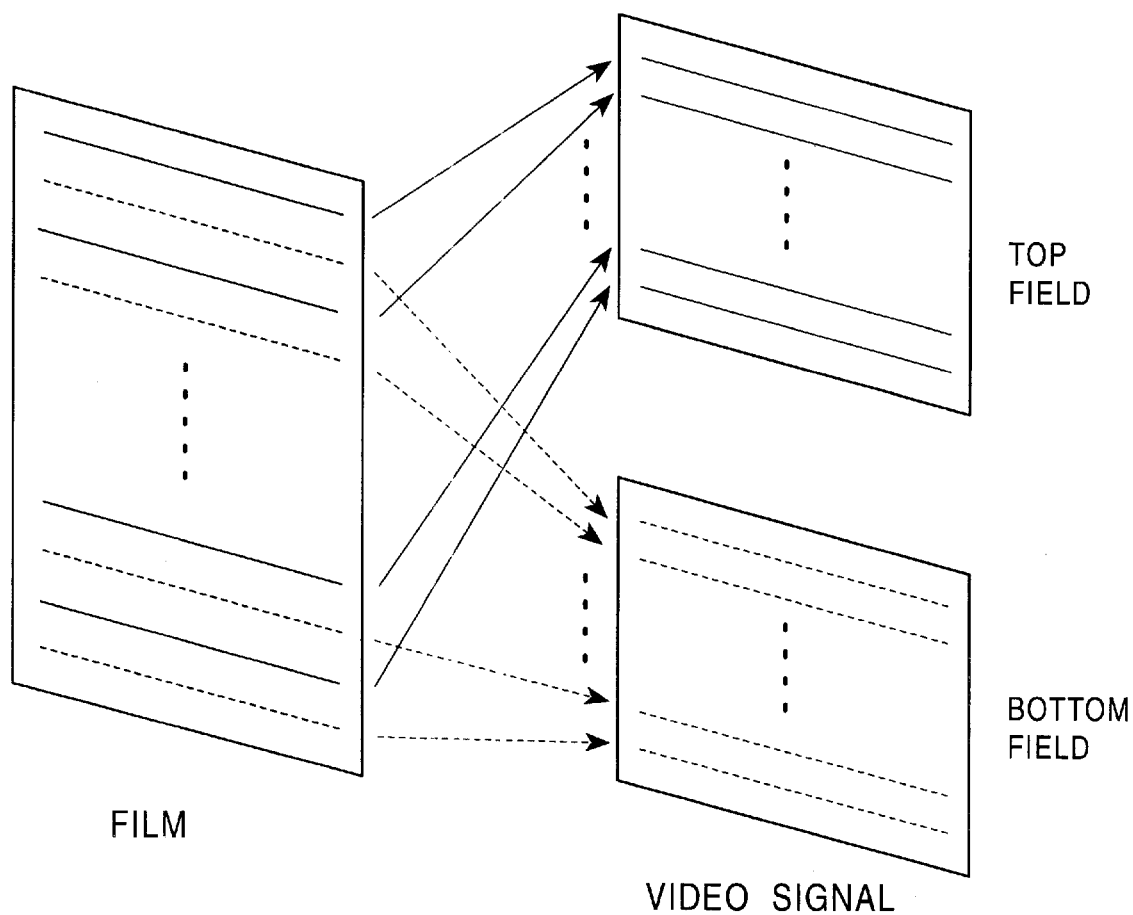
FIG. 26 illustrates the relationship between the frame and the field.
Figure 28:
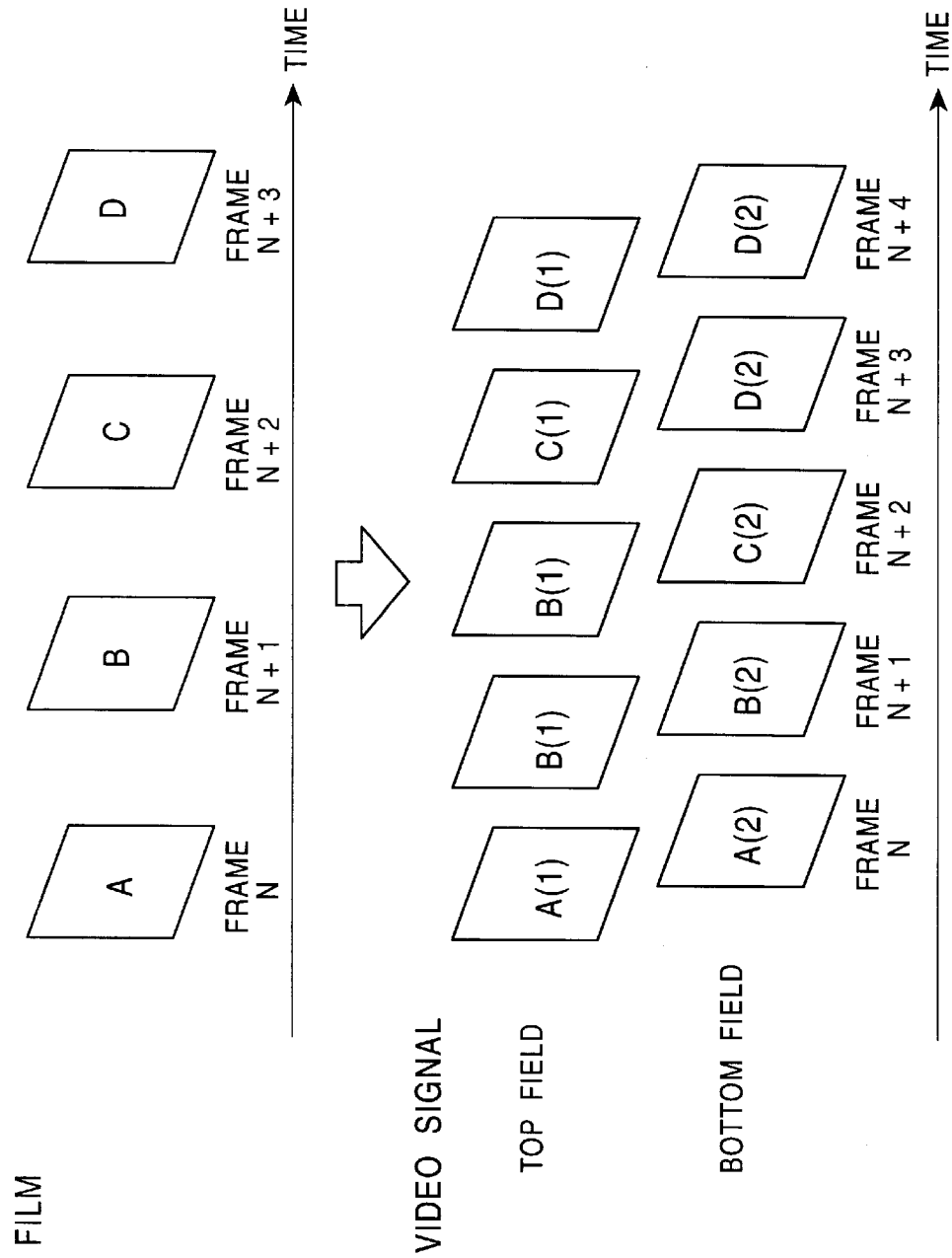
FIG. 28 illustrates a 2-3 pulldown process.
Figure 29:
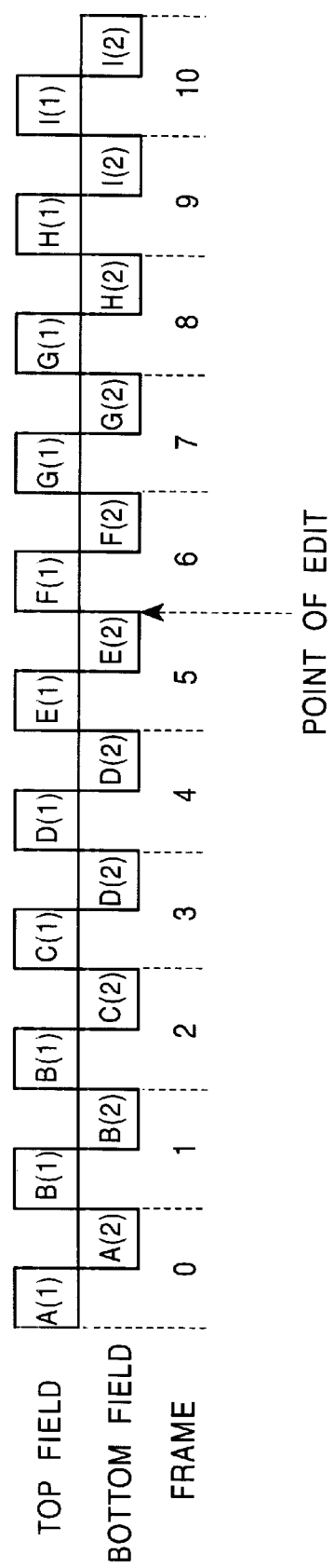
FIG. 29 illustrates a 2-3 pulldown processed image that has been edited.

More particularly, the controller 23 performs the process according to a flow diagram shown in FIG. 25 when the pulldown pattern is the pattern 2 or 4.

In the (x,y) coordinate system, let Y1(x,y) and Y3(x,y) represent the pixel values in the field 1 and 3, respectively. Let W and H represent, respectively, the number of pixels along the horizontal row and the vertical column for the field image signal.

In step S121, variables X(1) and X(2) respectively are set to 0 as their initial value. In step S122, the variable y representing the y coordinate is set to 0 as its initial value and the process goes to step S123. In step S123, the variable x representing the x coordinate is set to 0 as its initial value, and the process goes to step S124. The variables X(1) and X(2) are updated according to the following equations.

$$X(1) \leftarrow X(1) + |Y1(x,y) - Y2(x,y)|$$

$$X(2) \leftarrow X(2) + |Y2(x,y) - Y3(x,y)|$$

Values Y1(x,y)−Y2(x,y) and Y2(x,y)−Y3(x,y) in symbols ∥ indicating absolute values are respectively computed by the arithmetic units $22_1$ and $22_2$, and are fed to the controller 23. More particularly, the arithmetic unit $22_1$ reads two pixel values Y1(x,y) and Y2(x,y) for the fields 1 and 2 from the field memories $21_1$ and $21_2$, respectively, computes Y1(x,y)−Y2(x,y), and outputs the computing result to the controller 23. Likewise, the arithmetic unit $22_2$ reads two pixel values Y2(x,y) and Y3(x,y) for the fields 2 and 3 from the field memories $21_2$ and $21_3$, computes Y2(x,y)−Y3(x,y), and outputs the computing result to the controller 23.

In step S125, the variable x is incremented by 1, and the process goes to step S126, where a determination is made of whether the variable x is equal to the number of pixels W. When it is determined in step S126 that the variable x is not equal to W, the process returns to step S124. When it is determined in step S126 that the variable x is equal to W, the process goes to step S127, where the variable y is incremented by 1.

In step S128, a determination is made of whether the variable y is equal to the number of pixels H. When it is determined in step S128 that the variable y is not equal to H, the process returns to step S123. When it is determined in step S128 that the variable y is equal to H, the process goes to step S129, where a determination is made of which of the variables X(1) and X(2) is greater in magnitude.

When it is determined in step S129 that the variable X(1) is equal to or smaller than (alternatively, smaller than) the variable X(2), the process goes to step S130. The selector 24 is controlled to delete the field 3 of the two fields 1 and 3 and select the field 1. The process thus ends.

When it is determined in step S129 that the variable X(1) is greater than (alternatively, equal to or greater than) the variable X(2), the process goes to step S131. The selector 24 is controlled to delete the field 1 of the two fields 1 and 3 and select the field 3. The process thus ends.

As described above, the field/frame converter circuit 2 constructs the frame image signal from the field image signal and feeds it along with the pulldown information (flags TFF and RFF) to the succeeding stage encoder 3 (FIG. 1).

The encoder 3 codes the frame image signal from the field/frame converter circuit 2 in accordance with the MPEG standard and outputs the coded signal.

As described above, the field 1 or 3, whichever is preferable, is selected to construct the frame image signal. Redundant information quantity contained in the image is thus reduced, and coding efficiency is accordingly heightened. The quality of decoded image is also improved.

The encoder 3 outputs the pulldown information from the field/frame converter circuit 2, namely, the flags TFF and RFF in the picture layer. A decoder side references the flags TFF and RFF to convert the frame image signal into a 2-3 pulldown processed image signal.

Although the present invention has been discussed in connection with the processing of the 2-3 pulldown processed image, the present invention will equally work in any applications which process an image containing the same field following two fields behind a field of interest.

In the embodiments of the present invention, the pulldown pattern is determined using the comparative information for the current field image and the comparative information of the fields that follow the current field. The comparative information of the (past) fields that precede the current field may also be used.

In the embodiments of the present invention, the repeat field is detected based on the single piece of comparative information Cmp(0) only, when the detection period of the repeat field is stable. The repeat field may be detected using a plurality of pieces of comparative information.

According to the field detection apparatus and the field detection method of the present invention, a differential value between one input field and the subsequent field that follows two fields behind the input field is computed, and the repeat field is detected based on the differential value. The detection criterion for detecting the repeat field is changed between when the detection period for the repeat field applied to the image signal is stable and when the detection period for the repeat field applied to the image signal is unstable. The detection of repeat field is performed at a high accuracy.

In the image coding apparatus and image coding method of the present invention, a repeat field that is identical to the field that precedes two fields ahead of the repeat field is detected and either the repeat field or the field two fields ahead is selected. The selected field and the field that precedes one field ahead of the repeat field are coded. The coding efficiency is thus improved.

The recording medium of the present invention records an image signal which is obtained by detecting a repeat field which is identical to the prior field that precedes two fields ahead of the repeat field, selecting between the repeat field and the prior field that precedes two fields ahead of the repeat field and coding both the selected field and the prior field that precedes one field ahead of the repeat field as one frame to generate a coded signal. As a result, the memory capacity requirement for the recording medium is reduced permitting more image to be recorded.

According to the recording method and the transmission method of the present invention, an image signal is recorded and transmitted which is obtained by detecting a repeat field which is identical to the prior field that precedes two fields ahead of the repeat field, selecting between the repeat field and the prior field that precedes two fields ahead of the repeat field and coding both the selected field and the prior field that precedes one field ahead of the repeat field as one frame to generate a coded signal. As a result, the memory capacity requirement for the recording medium is reduced permitting more image to be recorded. The image signal that is efficiently coded is recorded and transmitted.

What is claimed is:

1. A field detection apparatus which determines, from an image signal of consecutive frames, each frame including two fields, whether a given field is a repeat of the prior field which precedes two fields ahead of said given field, said apparatus comprising:

receiving means for receiving said image signal; and field detection means for detecting said repeat field which is identical to the prior field which precedes two fields ahead of said repeat field based on a predetermined detection criterion, wherein said detection criterion for detecting said repeat field is a threshold value changed by said field detection means between when the detection period for said repeat field applied to said image signal is stable and when the detection period for said repeat field applied to said image signal is unstable.

2. A field detection apparatus according to claim 1, wherein said detection means comprising:

computing means for computing a differential value between at least one input field and the subsequent field which follows two fields behind said input field, wherein field detection means detects said repeat field based on said differential value that is the output of said computing means.

3. A field detection apparatus according to claim 2, wherein said detection means detects said repeat field based on the result that is obtained by comparing said differential value with said threshold value in magnitude.

4. A field detection apparatus according to claim 3, wherein said computing means computes said differential value to each of a plurality of fields within a predetermined duration of time; and said field detection means comprises threshold computing means for computing said threshold value based on the plurality of differential values resulting from the plurality of fields within said predetermined duration of time.

5. A field detection apparatus according to claim 4, wherein said threshold computing means computes, as said threshold value, the average of said plurality of differential values of said plurality of fields within said predetermined duration of time.

6. A field detection apparatus according to claim 4 further comprising scene change detection means for detecting a scene change in said image signal, wherein said threshold computing means computes said threshold value based on said plurality of fields within said predetermined duration of time but excluding a field having the scene change detected by said scene change detection means.

7. A field detection apparatus according to claim 2, wherein said detection means computes said repeat field based on said differential values of fields of a predetermined number when the detection period for said repeat field applied to said image signal is stable, wherein said predetermined number is at least one; and said detection means computes said repeat field based on said differential values of fields of a number greater than said predetermined number when the detection period for said repeat field applied to said image signal is unstable.

8. A field detection apparatus according to claim 7, wherein said detection means detects the subsequent field which follows two fields behind a field of interest, as a repeat field, when the detection period for said repeat field applied to said image signal is stable, and when the differential value of said field of interest is equal to or smaller than a predetermined threshold value; and said detection means detects the subsequent field which follows two fields behind a field of interest, as a repeat field, when the detection period for said repeat field applied to said image signal is unstable, when each of the differential values to two fields, namely, said field of interest and the subsequent field which follows five fields behind said field of interest, is equal to or smaller than said predetermined threshold and when each of the differential values to four fields, namely, the subsequent fields that follow one through four fields behind said field of interest, is greater than said predetermined threshold.

9. A field detection apparatus according to claim 2, wherein said detection means detects the subsequent field that follows two fields behind a field of interest, as a repeat field, when each of the differential values to two fields, namely, said field of interest and the subsequent field that follows five fields behind said field of interest, is smaller than said threshold value.

10. A field detection apparatus according to claim 2, wherein said image signal includes at least an image signal that is obtained through 2-3 pulldown processing.

11. A field detection method which determines, from an image signal of consecutive frames, each frame including two fields, whether a given field is a repeat of the prior field that precedes two fields ahead of said given field, said method comprising the steps of:

computing a differential value between at least one input field and the subsequent field that follows two fields behind said input field; and detecting said repeat field based on said differential value that is the output of said computing step, wherein a detection criterion for detecting said repeat field is a threshold value changed in said field detecting step between when the detection period for said repeat field applied to said image signal is stable and when the detection period for said repeat field applied to said image signal is unstable.

12. An image coding apparatus for coding an image signal of consecutive frames, each frame including two fields, said apparatus comprising:

detection means for detecting a repeat field which is identical to a prior field that precedes two fields ahead of said repeat field by comparing a differential value with a threshold value, said threshold value is changed in a field detecting step;

selecting means for selecting between said repeat field and the prior field that precedes two fields ahead of said repeat field; and coding means for coding both said selected field and the prior field that precedes one field ahead of said repeat field as one frame to generate a coded signal.

13. An image coding apparatus according to claim 12 further comprising adding means for adding repeat information about said repeat field to said coded signal.

14. An image coding apparatus according to claim 13, wherein said repeat information includes first flag indicating which field of the two fields constituting one frame is presented earlier, and second flag indicating whether a first presented field is again presented two fields later.

15. An image coding apparatus according to claim 12 further comprising:
first computing means for computing a first differential value between the prior field that precedes one field ahead of said repeat field and the prior field that precedes two field ahead of said repeat field; and
second computing means for computing a second differential value between said repeat field and the prior field that precedes one field ahead of said repeat field,
wherein said selecting means selects between said repeat field and the prior field that precedes two fields ahead of said repeat field, based on the result that is obtained by comparing said first differential value with said second differential value in magnitude.

16. An image coding apparatus according to claim 12, wherein a detection criterion for detecting said repeat field is changed by said detection means between when the detection period for said repeat field applied to said image signal is stable and when the detection period for said repeat field applied to said image signal is unstable.

17. An image coding method for coding an image signal of consecutive frames, each frame including two fields, said method comprising the steps of:
detecting a repeat field which is identical to the prior field that precedes two fields ahead of said repeat field by comparing a differential value with a threshold value, said threshold value is changed in a field detecting step;
selecting between said repeat field and the prior field that precedes two fields ahead of said repeat field; and
coding both said selected field and the prior field that precedes one field ahead of said repeat field as one frame to generate a coded signal.

18. An image coding method according to claim 17 further comprising the step of adding repeat information about said repeat field to said coded signal.

19. An image coding method according to claim 18, wherein said repeat information includes first flag indicating which field of the two fields constituting one frame is presented earlier, and second flag indicating whether a first presented field is again presented two fields later.

20. A recording medium which is subjected to decoding by an image decoding apparatus corresponding to an image coding apparatus, and which holds recorded signal including a coded signal and repeat information, said coded signal constructed by the steps of:
detecting a repeat field which is identical to the prior field that precedes two field ahead of said repeat field by comparing a differential value with a threshold value, said threshold value is changed in a field detecting step;
selecting between said repeat field and the prior field that precedes two fields ahead of said repeat field; and
coding both said selected field and the prior field that precedes one field ahead of said repeat field as one frame to generate a coded signal.

21. A recording medium according to claim 20, wherein said repeat information includes first flag indicating which field of the two fields constituting one frame is presented earlier, and second flag indicating whether a first presented field is again presented two fields later.

22. A recording method for recording a coded signal obtained by coding an image signal of consecutive frames, each frame including two fields, said method comprising the steps of:
detecting a repeat field which is identical to the prior field that precedes two fields ahead of said repeat field by comparing a differential value with a threshold value, said threshold value is changed in a field detecting step;
selecting between said repeat field and the prior field that precedes two fields ahead of said repeat field; and
coding both said selected field and the prior field that precedes one field ahead of said repeat field as one frame to generate a coded signal; and
recording said coded signal.

23. A recording method according to claim 22 further comprising the step of adding repeat information about said repeat field to said coded signal.

24. A recording method according to claim 23, wherein said repeat information includes first flag indicating which field of the two fields constituting one frame is presented earlier, and second flag indicating whether a first presented field is again presented two fields later.

25. A transmission method for transmitting a coded signal obtained by coding an image signal of consecutive frames, each frame including two fields, said method comprising the steps of:
detecting a repeat field which is identical to the prior field that precedes two fields ahead of said repeat field by comparing a differential value with a threshold value, said threshold value is changed in a field detecting step;
selecting between said repeat field and the prior field that precedes two fields ahead of said repeat field; and
coding both said selected field and the prior field that precedes one field ahead of said repeat field as one frame to generate a coded signal; and
transmitting said coded signal.

26. A transmission method according to claim 25 further comprising the step of adding repeat information about said repeat field to said coded signal and transmitting said repeat information added coded signal.

27. A transmission method according to claim 26, wherein said repeat information includes first flag indicating which field of the two fields constituting one frame is presented earlier, and second flag indicating whether a first presented field is again presented two fields later.

* * * * *